United States Patent
Minogue

(10) Patent No.: US 9,552,565 B2
(45) Date of Patent: Jan. 24, 2017

(54) METHOD AND SYSTEM FOR SPECIALIZED HANDLING OF PACKAGES

(71) Applicant: Fisher Clinical Services Inc., Allentown, PA (US)

(72) Inventor: Gregory Alan Minogue, Orefield, PA (US)

(73) Assignee: Fisher Clinical Services Inc., Allentown, PA (US)

(*) Notice: Subject to any disclaimer, the term of this patent is extended or adjusted under 35 U.S.C. 154(b) by 0 days.

(21) Appl. No.: 14/444,103

(22) Filed: Jul. 28, 2014

(65) Prior Publication Data
US 2015/0034720 A1    Feb. 5, 2015

Related U.S. Application Data

(63) Continuation-in-part of application No. 13/956,972, filed on Aug. 1, 2013.

(51) Int. Cl.
G06Q 10/08     (2012.01)

(52) U.S. Cl.
CPC ........ *G06Q 10/0832* (2013.01); *G06Q 10/083* (2013.01); *G06Q 10/0875* (2013.01)

(58) Field of Classification Search
CPC ............ G06Q 10/0832; G06Q 10/0875; G06Q 10/083
See application file for complete search history.

(56) References Cited

U.S. PATENT DOCUMENTS

| | | | |
|---|---|---|---|
| 5,038,283 A | 8/1991 | Caveney | |
| 5,646,389 A | 7/1997 | Bravman et al. | |
| 5,712,989 A | 1/1998 | Johnson et al. | |
| 5,831,859 A | 11/1998 | Medeiros et al. | |

(Continued)

FOREIGN PATENT DOCUMENTS

| | | |
|---|---|---|
| WO | 0203164 A2 | 1/2002 |
| WO | 0203165 A2 | 1/2002 |

OTHER PUBLICATIONS

International Searching Authority, International Search Report and Written Opinion issued in International Application No. PCT/US2014/49168 dated May 1, 2015.

(Continued)

*Primary Examiner* — Kristy A Haupt
(74) *Attorney, Agent, or Firm* — Wood Herron & Evans LLP

(57) ABSTRACT

Methods and systems for providing information relating to specialized handling of a package, and articles contained within the package. Data relating to a package containing an article that requires specialized handling is associated with a unique identifier and stored in a database. The unique identifier is also included in a machine readable code affixed to the package. A recipient of the package scans the machine readable code using an application downloaded into a computing device, which extracts the unique identifier from the machine readable code and transmits a request to the database. The database may then identify data stored in the database that relates to the article based on the unique identifier, and transmit the data to the computing device for display to the recipient. The data may include a packing list, instructions for how to unpack the package, and how to store or use articles contained within the package.

16 Claims, 25 Drawing Sheets

(56) References Cited

U.S. PATENT DOCUMENTS

| | | | |
|---|---|---|---|
| 6,023,683 | A | 2/2000 | Johnson et al. |
| 6,430,457 | B1 | 8/2002 | Van De Loo |
| 6,539,360 | B1 | 3/2003 | Kadaba |
| 6,766,956 | B1 | 7/2004 | Boylan, III et al. |
| 7,313,537 | B1 | 12/2007 | Burrell et al. |
| 7,596,508 | B1 | 9/2009 | McGuffie et al. |
| 7,689,465 | B1 | 3/2010 | Shakes et al. |
| 7,769,221 | B1 | 8/2010 | Shakes et al. |
| 7,823,778 | B1 | 11/2010 | Singh et al. |
| 7,878,329 | B1 | 2/2011 | McCarron et al. |
| 7,938,326 | B2 | 5/2011 | Dearing et al. |
| 8,086,546 | B2 | 12/2011 | Spiegel et al. |
| 8,154,421 | B2 | 4/2012 | Saltzman et al. |
| 8,156,013 | B2 | 4/2012 | Dearlove et al. |
| 8,175,935 | B2 | 5/2012 | Dearlove et al. |
| 8,219,463 | B2 | 7/2012 | Dearlove et al. |
| 8,260,656 | B1 | 9/2012 | Harbick et al. |
| 8,266,017 | B1 | 9/2012 | Dearlove et al. |
| 8,271,398 | B2 | 9/2012 | Spiegel et al. |
| 8,306,862 | B2 | 11/2012 | Weiler et al. |
| 8,355,963 | B2 | 1/2013 | Sicard |
| 8,615,473 | B2 | 12/2013 | Spiegel et al. |
| 2002/0158137 | A1* | 10/2002 | Grey ............... G06K 19/06009 235/494 |
| 2003/0200155 | A1 | 10/2003 | Ouchi |
| 2004/0148052 | A1 | 7/2004 | Ferguson et al. |
| 2004/0243460 | A1 | 12/2004 | Dogan et al. |
| 2005/0114219 | A1 | 5/2005 | Sultan |
| 2006/0007304 | A1 | 1/2006 | Anderson |
| 2006/0273167 | A1 | 12/2006 | Baldassari et al. |
| 2006/0282345 | A1 | 12/2006 | Nelson |
| 2007/0150361 | A1 | 6/2007 | Kreiner et al. |
| 2007/0198297 | A1 | 8/2007 | Perkins et al. |
| 2007/0203808 | A1 | 8/2007 | Sekimoto et al. |
| 2008/0140432 | A1 | 6/2008 | Fenn |
| 2008/0183599 | A1 | 7/2008 | Hill et al. |
| 2009/0101281 | A1 | 4/2009 | Sacherer |
| 2009/0125411 | A1 | 5/2009 | Otto et al. |
| 2010/0268659 | A1 | 10/2010 | Zimberoff et al. |
| 2011/0029344 | A1 | 2/2011 | Weiler et al. |
| 2011/0173041 | A1 | 7/2011 | Breitenbach et al. |
| 2012/0179621 | A1* | 7/2012 | Moir et al. ............... 705/332 |
| 2012/0232942 | A1 | 9/2012 | Gaug et al. |
| 2012/0271777 | A1 | 10/2012 | Kadaba |
| 2013/0018356 | A1 | 1/2013 | Prince et al. |
| 2013/0346186 | A1 | 12/2013 | Bezos et al. |

OTHER PUBLICATIONS

Health Industry Business Communications Council, The Health Industry Bar Code (HIBC) Supplier Labeling Standard, ANSI/HIBC 2.3—2009 (38 pages).

ASAP Systems, Live Chat (Offline), Industry Solutions, Chemical and Drum Tracking, retrieved from www.asapsystems.com/chemical.php on Apr. 19, 2013 (3 pages).

Tedia High Purity Solvents, Customer Letter, Mar. 22, 2012 (3 pages).

\* cited by examiner

METHOD AND SYSTEM FOR SPECIALIZED HANDLING OF PACKAGES

CROSS-REFERENCE TO RELATED APPLICATIONS

The present application is a Continuation-In-Part of co-pending U.S. patent application Ser. No. 13/956,972, filed Aug. 1, 2013, the disclosure of which is hereby incorporated herein by reference in its entirety.

FIELD OF THE INVENTION

The present invention relates generally to methods and systems for managing packages requiring special handling and, more particularly, to methods and systems for providing special handling instructions to recipients of the packages, and tracking the handling of the packages.

BACKGROUND OF THE INVENTION

Certain industries and fields of endeavor, such as clinical studies of pharmacological products, sometimes require that articles be shipped with special handing. The viability, metabolic state (e.g., active/dormant), life span, or other properties of these articles are dependent on proper handling both during shipment and after reception of the article. For example, vaccines, cell cultures, vials of injectable drugs, drugs including complex molecules in liquid form, and many other materials must typically be kept within a range of temperatures to remain viable and/or active. These materials must therefore be stored, transported, and maintained at controlled temperatures by a temperature-controlled supply chain that provides a strict system of temperature control to assure the potency and safety of the materials.

Because a single broken link in the temperature-controlled supply chain can result in loss of the materials, it may also be necessary to unpack articles requiring special handling within a limited amount of time and under specific environmental conditions to prevent damage to, or contamination of, the articles. Thus, special handling requirements may extend to how the package is treated at the receiving end. Packages may also contain clinical trial samples, in which case it may also be necessary for the recipient to track and distribute the articles in the package in a proscribed manner to preserve the integrity of clinical trial results and the identity of the participant.

Packages requiring special handling may also include a tracking device that collects data on environmental conditions during shipment. For example, a tracking device may be included in the package that monitors the temperature of an article in the package to determine if the article may have been damaged because it was not kept within a required temperature range during shipment. When a tracking device is included in the package, it may also be necessary for the tracking device to be deactivated and its data retrieved as part of the receiving process.

Because packages containing articles requiring special handling typically have specific time sensitive needs with regard to how they are handled at the receiving end, it is important that the recipient know any special processing instructions at the time the article is delivered. However, packages that require special handling at the receiving end may arrive with other packages that do not require special handling. Moreover, because the requirements for handling each package may differ, there is a danger that the receiving party will handle the package improperly, or not realize that the package requires special handling, resulting in damage to or loss of the package contents. This can be especially problematic for pharmaceutical testing facilities, which typically receive multiple shipments from multiple sources per day, with each shipment including packages related to different clinical studies.

Thus, there is a need for improved methods and systems of tracking and receiving packages requiring special handling, of providing handling instructions for these packages, and for reducing the potential for improper handling of the packages.

SUMMARY OF THE INVENTION

The present invention overcomes the foregoing problems and other known shortcomings, drawbacks, and challenges of providing specialized handling of packages in a complex distribution and/or use environment. While the present invention will be described in connection with certain embodiments, it will be understood that the present invention is not limited to these embodiments. To the contrary, the present invention includes all alternatives, modifications, and equivalents as may be included within the spirit and scope of the present invention.

In one embodiment of the present invention, a method for providing instructions for handling a package requiring specialized handling is provided. The method includes storing, in a database, data that includes a packing list for the package and relates to the instructions on handling the package. The method further includes associating a unique identifier identifying the package with the data, and providing a machine readable code that includes the unique identifier and is associated with the package. In response to the machine readable code being scanned by a scanning device, the method transmits the data from the database to a data receiving device.

In another embodiment of the present invention, a method is provided for managing inventory. The method includes receiving the package including the machine readable code, and scanning the machine readable code with the scanning device. The method further includes, in response to scanning the first machine readable code, receiving data including a packing list at a receiving device. The method further includes displaying the packing list on the receiving device.

In another embodiment of the present invention, a system that provides instructions for handling the package requiring specialized handling is provided. The system includes a processor and memory including program code. The program code is configured so that when the code is executed by the processor, the code causes the system to store data that includes the packing list and the instructions for handling the package in the database, and associate the unique identifier identifying the package with the data stored in the database. The code is further configured to cause the processor to provide the machine readable code that includes the unique identifier and is associated with the package. In response to the machine readable code being scanned by a scanning device, the program code further causes the processor to transmit the data that includes the packing list for the package and that relates to the instructions for handling the package from the database to the data receiving device.

In another embodiment of the present invention, a system is provided for managing inventory. The system includes a processor and memory including program code. The program code is configured so that when the code is executed by the processor, the code causes the system to scan the machine readable code on the received package, receive the data including the packing list in response to scanning the machine readable code, and display the packing list.

In another embodiment of the present invention, a computer program product is provided. The computer program product includes a non-transitory computer readable storage medium, and program code stored on the non-transitory computer readable storage medium that, when executed by a processor, causes the processor to store data in the database that includes the packing list and relates to instructions on handling the package. The program code may further cause the processor to associate the unique identifier identifying the package with the data, and provide the machine readable code associated with the package that includes the unique identifier. In response to the machine readable code being scanned by the scanning device, the program code may further cause the processor to transmit the data from the database to the data receiving device.

In another embodiment of the present invention, a computer program product is provided. The computer program product includes a non-transitory computer readable storage medium, and program code stored on the non-transitory computer readable storage medium that, when executed by a processor, causes the processor to scan the machine readable code on the received package. In response to scanning the machine readable code, the program code may cause the processor to receive data including the packing list for the received package, and display the packing list.

BRIEF DESCRIPTION OF THE DRAWINGS

The accompanying drawings, which are incorporated in and constitute a part of this specification, illustrate embodiments of the present invention and, together with a general description of the present invention given above, and the detailed description of the present invention given below, serve to explain the principles of the present invention.

FIG. 15 is a diagrammatic view of an exemplary screen shot of the computing device of FIG. 1 illustrating a user interface displayed by the application showing a scan history and information on a scanned package.

FIG. 16 is a diagrammatic view of an exemplary screen shot of the computing device of FIG. 1 illustrating the user interface of FIG. 15 displaying unpacking instructions for the package.

FIG. 22 is a diagrammatic view of an exemplary screen shot of the computing device of FIG. 1 illustrating a user interface displayed by the application showing unpacking instructions for one of the payloads in FIG. 21.

DETAILED DESCRIPTION OF THE INVENTION

Figure 1:
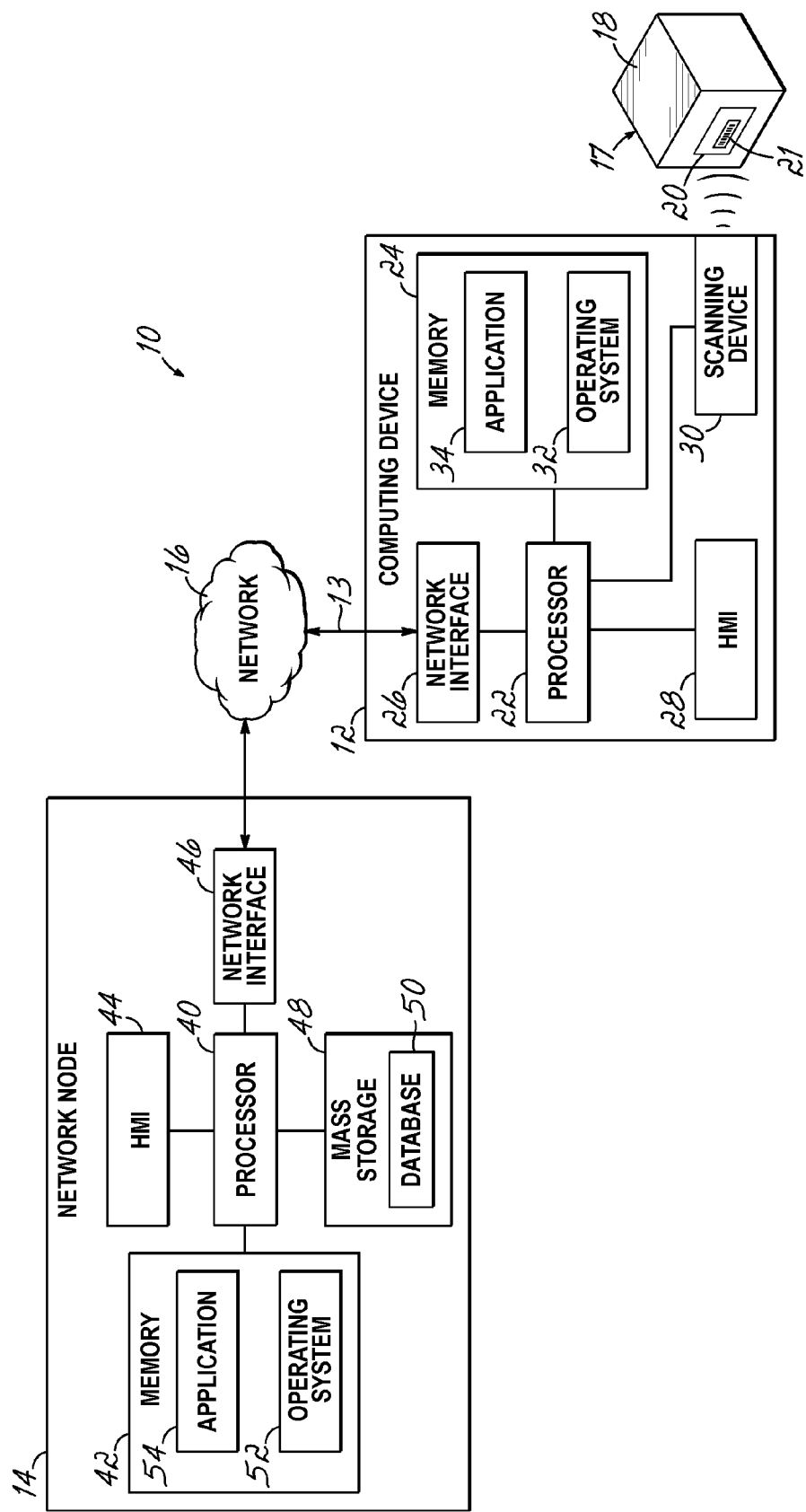
FIG. 1 is a schematic block diagram illustrating a computing device scanning an exemplary label affixed to a package, and a network node in communication with the computing device via a network.

Embodiments of the present invention are directed to methods and systems for providing instructions on handling packages that require special handling by the package recipient. The package may comprise a shipping container, one or more payloads contained within the shipping container, and a label including a machine readable code that can be read by suitable computing device, such as a smart phone, tablet computer, or other "reading device" configured to read the machine readable code. Each payload may comprise one or more articles in a separate container within the shipping container, and may include an additional label including another machine readable code. The articles comprising the payload may be articles being shipped to a specific recipient, that are to be stored in a specific location, or that are otherwise related.

The machine readable code may include data uniquely identifying the package, payload, and/or article to which the label is affixed, and data identifying a link to a network node, such as a database. The reading device may include an application that transmits a query to the database in response to scanning the machine readable code. The database may store data relating to the package, payload, and/or article that is provided to the reading device in response to the query. This data may include package handling instructions, such as how to unpack the package, how to distribute payloads and/or articles in the package, and how to store the payloads and/or articles once they are unpacked. The handling instructions may be associated with the unique identifier in the database so that the provided instructions can be specific to the particular package, payload, and/or article scanned.

In response to scanning the machine readable code, the reading device may use the link identified by data extracted from the machine readable code to communicate with the database and download the handling instructions. This communication may also provide a proof of delivery function by notifying the database that the package, payload, and/or article has been received. The reading device may also request the user enter information confirming receipt of the package, or informing the supplier of missing or damaged articles.

By storing the unpacking instructions in the database rather than, or alternatively, in addition to including the instructions with the package, the instructions may be updated at any time, including after the package has shipped. Thus, the instructions may be kept more current than would be possible for instructions provided on a sheet shipped with the package. In addition, because instructions are provided in response to scanning the machine readable code, a package recipient may be automatically and immediately alerted to any special handling requirements at the time the package is received.

The application loaded on the reading device may allow labels to be scanned by a recipient wherever the package, payload, and/or article is found and without specialized equipment. To this end, the link identifying data may include a Uniform Resource Identifier (URI), such as a Uniform Resource Locator (URL), Uniform Resource Name (URN), or web address that links the reading device to the unpacking instructions via the Internet. The link may also be a link unique to the package, payload, and/or article, so that the link both identifies a communication path and provides the unique identifier.

Embodiments of the invention are not limited to mobile computing devices, such as smart phones or tablet computers, or computing devices that communicate with the database over the Internet. Indeed, a person having ordinary skill in the art would understand that alternative embodiments of the present invention may have the application implemented on any type of suitable computing device, such as a desktop computer in a shipping and receiving area. Moreover, this person of ordinary skill would further understand that the link may include any suitable electronic address that provides a location of an electronic file in a computer filing system or data network.

The method and system of the present invention may also be applied in the distribution of temperature sensitive laboratory reagents. Examples of these reagents may include enzymes shipped in a frozen condition maintained by ice packs or dry ice, or cell culture media shipped in a refrigerated condition. Such reagents are often stocked in freezers or refrigerators in a university or other research laboratory, withdrawn for particular experiments, and periodically restocked. Various systems may be used to track the amounts of various reagents withdrawn by particular scientists or technicians. The withdrawn amounts may be charged to a corresponding account, and the reagents periodically restocked by a distributor or manufacturer of the respective enzyme and/or cell culture media. In some instances, because of consignment arrangements, invoicing to a customer institution may be associated with individual withdrawals from the freezer or refrigerator rather than with the restocking order and shipment.

To facilitate this invoicing and restocking, one or more machine readable codes may be placed on the exterior of the shipping container, payload containers within the shipping container, and/or articles in the payload containers. When read on receipt, these codes may direct a computing device at the receiving location to a database which may contain: (1) a list of the products in the shipment, and/or (2) instructions on putting the contents of the shipment into a particular freezer or a particular refrigerator, or instructions on putting a portion of the contents into one freezer or refrigerator and for putting other portions of the contents into a different freezer or refrigerator. The instructions may also prompt the user to provide information that allows the system to confirm that the contents were received in good condition, or to address missing or damaged contents.

Referring now to FIG. 1, a system 10 for providing special handling and tracking of packages in accordance with an embodiment of the present invention includes a reading device, such as computing device 12, and a network node 14 in communication with the computing device 12 via a network 16. The system 10 may be part of a Global Project Management (GPM) system that manages a plurality of activities that are needed to run one or more projects, such as a clinical trial. Thus, and by way of example, the system 10 may include hardware and/or software modules (not shown) configured to invoice a client for services performed in connection with a clinical trial. One such service may be delivery of clinical trial materials to a clinical investigation facility. The scope of services that may be provided by the system 10 may further include inventory and product management modules, such as packaging of trial drug samples, comparators, and/or placebos into bottles or blister packs for use in a clinical trial. This packaging may occur before any allocation of particular inventory to particular clinical investigators has been made. However, the system 10 is not limited to clinical trial applications. Other applications may include, but are not limited to, quality management systems configured to analyze, measure, control, document, and validate delivery of environmentally sensitive articles to research facilities, medical facilities, laboratories, or any other user of environmentally sensitive articles.

In an embodiment of the present invention, the system 10 is configured to provide handling instructions to a recipient of a package 17. The package 17 may include a shipping container 18 that contains one or more payloads requiring special handling, and a receiving label 20 that includes one or more machine readable codes 21. The computing device 12 may be a smart phone, a tablet computer, or any other device suitable for scanning the machine readable code 21 and communicating with the network node 14 and/or other system resources over the network 16. The network 16 may include one or more local access networks (LANs), wireless networks (private or commercial), and/or publically accessible networks, such as the Internet, that communicatively couples the computing device 12 to the network node 14.

The computing device 12 may be coupled to the network 16 using any suitable communication link 13, such as a wireless communication link. To this end, the network 16 may include a wireless access point (not shown) that provides a wireless interface, such as an IEEE 802.11 air interface (commonly known as Wi-Fi) that operatively couples the computing device 12 to the network 16. The network 16 may thereby allow the computing device 12 to establish the communication link 13 as needed to communicate with the network node 14 and/or any other computer resources connected to the network 16 without requiring the computing device 12 be physically tethered to the network 16. The communication link 13 may also be provided by a wireless carrier that provides network access through a suitable commercial air interface, such as WiMax, GPRS, EDGE, 1xRTT, EV-DO, and/or UMTS. In any case, persons having ordinary skill in the art of computer networks will understand that any suitable wireless or wire-line protocol may be employed to provide communication between the computing device 12 and the network 16. The present invention is therefore not limited to a specific type of computing device 12, communication link 13, or network 16. Persons having ordinary skill in the art will further understand that embodiments of the present invention also include devices that provide the functions of the computing device 12, but that are physically tethered to the network. For example, a desktop computer having a wired network connection may be used to scan the receiving label 20 of shipping container 18 as packages are received in a shipping and receiving department.

The computing device 12 includes a processor 22, a memory 24, a network interface 26, a human-machine interface (HMI) 28, and a scanning device 30. The processor 22 may include one or more processors selected from microprocessors, micro-controllers, digital signal processors, microcomputers, central processing units, field programmable gate arrays, programmable logic devices, state machines, logic circuits, and/or any other devices that manipulate signals (analog and/or digital) based on operational instructions that are stored in memory 24. Memory 24 is operatively coupled to the processor 22, and may be a single memory device or a plurality of memory devices including but not limited to read-only memory (ROM), random access memory (RAM), volatile memory, non-volatile memory, static random access memory (SRAM), dynamic random access memory (DRAM), flash memory, cache memory, and/or any other device capable of storing data.

Processor 22 may operate under the control of an operating system 32 that resides in memory 24. When present, the operating system 32 manages the computing device resources so that program code embodied as one or more applications 34 residing in memory 24 may have instructions executed by the processor 22. In an alternative embodiment, the application 34 may be executed by the processor 22 directly, in which case the operating system 32 may be omitted. The network interface 26 of computing device 12 may include suitable radio transceiver circuitry. The network interface 26 may thereby be configured to support the wireless communication link 13 between the computing device 12 and the network 16.

The human-machine interface 28 is operatively coupled to the processor 22 of computing device 12, and includes at least one output device and one input device. Suitable output devices for the human-machine interface 28 include, but are not limited to, a touch screen, an alphanumeric display, an audio transducer, and/or any other visual, audible, and/or tactile indicator. Likewise, suitable input and/or control devices include, but are not limited to, the aforementioned touch screen, an alphanumeric keyboard or keypad, a pointing device, pushbuttons, a microphone, and/or any other device capable of accepting commands or input from the user and transmitting the entered input to the processor 22. The human-machine interface 28 thereby provides a mechanism whereby a user may input data to, and receive data from, the processor 22.

The scanning device 30 is configured to scan the machine readable code 21, the most common forms of which are referred to as a barcode (in the case of a 1-dimensional code) or a Quick Response (QR) code (in the case of a 2-dimensional code). Although the embodiments of the present invention described herein are generally described as using printed barcodes and/or QR codes, it should be understood that embodiments of the present invention may also be used with other devices configured to store data, such as a Radio Frequency Identity (RFID) tag attached to or placed in the shipping container 18. The term "machine readable code" should therefore not be considered as limiting the present invention to barcodes and/or QR codes as a method of storing data on the receiving label 20. Rather, the term "machine readable code" as used herein is intended to encompass all forms of data storage devices that can be read by scanning a label or device included in or on the shipping container 18.

To obtain data from the machine readable code 21, the scanning device 30 may include a light source, such as a laser, that illuminates the machine readable code 21, and a photo detector that generates an electrical signal in response to light reflected from the machine readable code 21. The scanning device 30 may, in addition to or instead of the light source and photo detector, include an image capturing device (e.g., a digital camera) that captures images representative of the surrounding environment. These captured images may be processed into any suitable digital image file format known in the art, such as a raw image file, bit map, or Joint Photographic Experts Group (JPEG) formatted image (to name but a few) by the processor 22 and stored in memory 24. A digital image processing technique may then be used by the application 34 to decode any machine readable code 21 that appears in the captured image. In embodiments of the present invention including an RFID tag, the scanning device 30 may include a radio transceiver (not shown) configured to transmit RF signals that activate the RFID tag, and receive RF signals from the RFID tag that are transmitted in response to said activation.

Similarly as described with respect to the computing device 12, the network node 14 may include one or more processors 40, a memory 42, a human-machine interface 44, and a network interface 46. The network interface 46 provides a communication link between the processors 40 and the network 16 using a suitable network communication protocol, such as Transmission Control Protocol/Internet Protocol (TCP/IP) over Ethernet.

The human-machine interface 44 includes one or more suitable output devices, such as a color monitor or other visual display, one or more speakers, one or more formatted electronic media writers, such as a flash memory card, memory stick, USB-stick, CD, magnetic disk, and/or any other suitable output devices capable of storing data or conveying data to the system user. The human-machine interface 44 may also include suitable input devices such as an alphanumeric keyboard, a pointing device or mouse, a touch pad, a microphone, one or more readers of the aforementioned formatted electronic media, or any other input devices capable of accepting commands or input from the user and transmitting the entered input to the processor 40.

The network node 14 may also include mass storage device 48. The mass storage device 48 may comprise a single mass storage device or a plurality of mass storage devices including but not limited to hard drives, optical drives, tape drives, non-volatile solid state devices and/or any other device capable of storing digital data. A database 50 residing in one or more of the memory 42 or the mass storage device 48 (shown) may include data relating to packages 17 so as to provide a searchable database that receives data from, and provides data to, one or more system applications, such as the application 34. Although shown as a single database 50, database 50 may include multiple databases configured to support various system functions. Moreover, although depicted as a single database residing in a single network node, a person having ordinary skill in the art would understand that the database 50 and/or the network node 14 may represent one or more hardware platforms each hosting one or more applications and/or databases. The network node 14, database 50, and any applications residing therein may also be provided as a service over the network 16 as part of a cloud computing system.

The network node processor 40 typically operates under the control of an operating system 52 that resides in memory 42 and executes program code embodied as one or more applications 54 residing in memory 42. The one or more applications 54 may include a plurality of program modules and/or programs that support various system functions. These applications 54 may access the database 50 to provide data to, and store data from, the application 34 in response to requests received over the network 16. One or more of these applications 54 may also be copied from the network node 14 to another memory, such as the memory 24 of computing device 12, as needed to perform functions related to the operation of the system 10.

Although illustrated as being deployed in a single hardware platform in FIG. 1 for simplicity's sake, it should be understood that the network node 14 may represent a plurality of network nodes, hardware platforms, software programs, and/or modules that comprise the system 10. Moreover, various program code described herein may be identified based upon the application or software component within which it is implemented in a specific embodiment of the present invention. However, it should be appreciated that any particular program nomenclature used herein is merely for convenience, and thus the present invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the present invention is not limited to the specific organization and allocation of program functionality described herein.

Thus, persons skilled in the art will recognize that the exemplary operational environment illustrated in FIG. 1 is not intended to limit the present invention. Embodiments of the present invention may therefore include alternative hardware and/or software environments, and incorporate different numbers and configurations of hardware and software resources without departing from the scope of the present invention.

Figure 2:
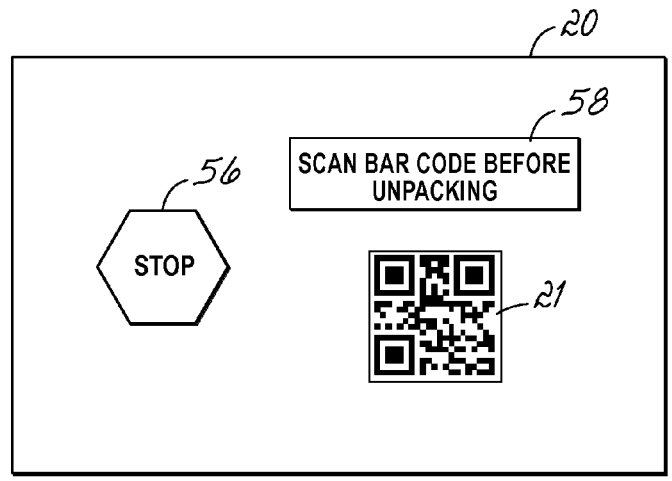
FIG. 2 is a diagrammatic view of the exemplary label of FIG. 1 illustrating a machine readable code included on the label.

Referring now to FIG. 2, in which like reference numerals refer to like features in FIG. 1, and in accordance with an embodiment of the present invention, the receiving label 20 is illustrated in more detail. The receiving label 20 may include an indicia 56 configured to capture the attention of a package recipient (such as the illustrated stop sign symbol), written instructions 58 informing the recipient to perform some task before unpacking (such as scanning the receiving label 20), and the machine readable code 21, which is depicted as a QR code. The instructions 58 may also inform the recipient of the need to download the application 34, and how the application 34 may be obtained (e.g., by visiting a web site). Optionally, the receiving label 20 may also include additional data and/or machine readable codes (not shown), that provide additional information. This additional information may include, for example, possible hazards associated with the contents of the shipping container 18, required safety codes, U.S. Department of Transportation (DOT) shipping information, or any other package data.

The machine readable code 21 may include a unique identifier that uniquely identifies the package, payload, and/or article to which the label 20 is affixed, and data identifying a link that can be used to obtain data relating to the package, payload, and/or article. The unique identifier may include, for example, a shipment number and authentication code. The authentication code may be configured so that simply providing a valid shipment number will not be sufficient to retrieve package data from the database 50. To this end, the authentication code may include encoded data that is known only to the database 50 and/or network node application 54. The authentication code may thereby be used to confirm that a received request for information is legitimate. This type of confirmation may be used, for example, to protect sensitive information relating to clinical trial supplies, samples, test subjects, clients, results, or any other sensitive data. An example of an authentication code would include a code comprising a shipment ID number and an authentication date. In an embodiment of the present invention, the unique identifier may be a 128-bit number that would be difficult to guess. This 128-bit unique identifier may be a globally unique identifier, and may be generated in a number of ways known in the art. For example, the 128-bit number may be defined by a combination of unique settings or parameters of a network node (e.g., an IP address, network MAC address, clock date/time, and/or random number) related to a specific point in time.

Figure 3:
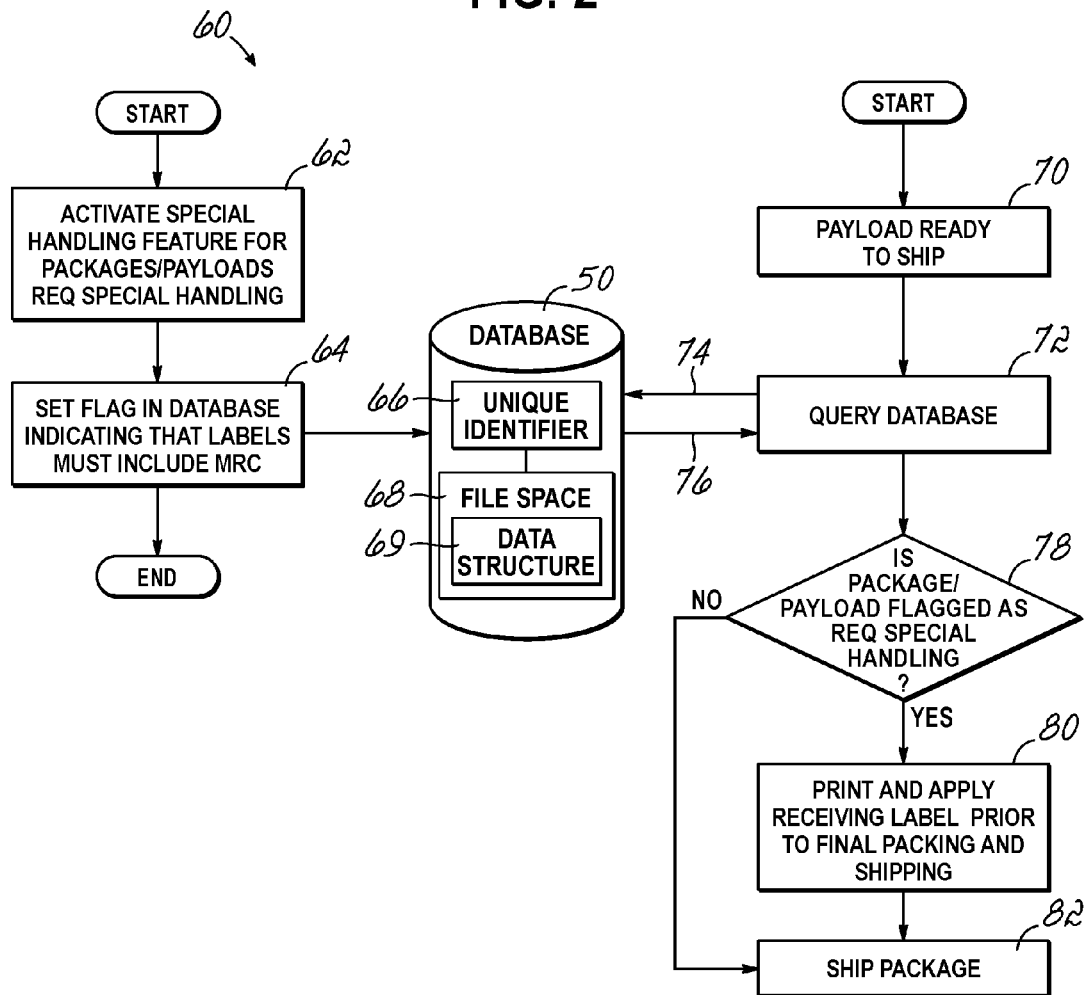
FIG. 3 is a flow chart illustrating a process for configuring a database to maintain a file space associated with a unique identifier embedded in the machine readable code of FIG. 2, and for generating the exemplary label.

Referring now to FIG. 3, in which like reference numerals refer to like features in FIG. 1, a flow chart 60 illustrates a process by which the system 10 may: (1) associate a unique identifier with the package 17 and/or the contents thereof, and (2) generate one or more receiving labels 20 for application to the package 17 and/or the contents thereof. In block 62, a special handling feature may be activated in the system 10. In response to activation of the special handling feature, the database 50 may generate a scan configuration table that includes an identity number, name, description, dollar value, and an active/inactive flag bit associated with the package 17, one or more contents of the package, and/or a study requiring special handling. The feature activation may be for a single package 17 that requires special handling, a single payload and/or article in the package 17, a plurality of payloads and/or articles in the package 17, or a plurality of packages 17 payloads and/or articles that are involved in a clinical study. For example, the feature may be activated for all packages 17 containing articles comprising samples being administered to test subjects as part of a clinical study for a pharmaceutical product. Activation of this special handling feature may cause the system 10 to require receiving labels 20 be printed and affixed to all packages 17, payloads, and/or articles in the packages 17 identified as being subject to this feature. For example, activation of the feature at a study level may require that all packages 17, payloads, and/or articles related to a particular clinical study be provided with the receiving labels 20. Activation of the special handling feature may also cause the database 50 to associate scanning of a receiving label 20 with an order for a product, associate the order with a protocol for administering the product, and/or associate the protocol with a client.

In block 64, a flag may be set in the database 50 indicating that an identified package 17, payload, and/or article requires special handling (e.g., is part of the clinical study). The flag may be set in the scan configuration table, and may be set at a study level (i.e., any package and/or payload involved in the study is flagged) or at a package 17, payload, and/or article level (i.e., only that package 17, payload, and/or article is flagged). In response to setting the flag, the database 50 may assign a unique identifier 66 to the package 17, payload, and/or article. The database 50 may also associate a file space 68 in the database 50 with the package 17, payload, and/or article based on the unique identifier 66. This file space 68 may be populated with one or more data structures 69 that include data relating to the package 17 and/or the contents thereof. This data may include, for example, data specific to the particular package 17, payload, and/or article, such as a packing list, detailed unpacking instructions, a current status of package 17, payload, and/or article, a shipping history of the package 17, payload, and/or article, destination and storage instructions for the payload and/or article once it is removed from the package 17.

Data in the file space 68 may be accessed by various system applications, such as the mobile and node applications 34, 54, to store and retrieve data specific to the package 17, payload, and/or article identified by the unique identifier 66. Additional data stored in the database 50 may include, but is not limited to: a receiving charge (which may be stored at a default level, and may be subject to study and client overrides), a transaction record with data indicative of what packages 17, payloads, and/or articles have been scanned for a particular study, the aforementioned detailed unpacking instructions, and flags at the study, package, payload, and/or article level that activate generation of the receiving label 20 and billing for the package 17, payload, and/or article.

In block 70, the one or more payloads to be shipped in the package 17 are packed with articles and made ready to ship. The articles may include, for example, pharmaceutical samples that are to be administered to a test subject as part of a clinical study. In block 72, a query 74 is transmitted to the database 50 requesting shipping data relating to the package 17, payloads, and/or articles in the package 17. The query 74 may be transmitted, for example, by a shipping management application (not shown) that is part of the system 10. In response to the query 74, the database 50 may determine that the package 17 and/or one of the one or more payloads and/or articles comprising the package 17 is flagged for special handling. Based on this determination, the database 50 may transmit a response 76 that includes the unique identifier 66 and data identifying a link to the file space 68. In response to receiving the response 76, the shipping management application may proceed to block 78.

In block 78, the shipping management application may determine if the package 17, payload, and/or article is flagged as being related to the clinical study or as otherwise requiring special handling. This determination may be based on data included in the response 76. If the package 17, payload, and/or article is flagged ("Yes" branch of decision block 78), the shipping management application may proceed to block 80 and cause one or more receiving labels 20 to be printed and affixed to the package 17, payload, and/or article prior to shipment. The shipping management application may also prompt the shipper to scan the receiving labels 20 to verify that the receiving labels 20 is configured properly and recognized by the system 10. This scanning operation may also generate a data point in the database 50 that verifies the package 17, payload, and/or article was shipped at a certain point in time. The receiving labels 20 may include the machine readable code 21, which in turn includes data corresponding to the unique identifier 66, and data identifying a link to the file space 68. The package 17, payload, and/or article may thereby be associated with the file space 68 in the database 50 by the receiving labels 20. The system 10 may be further configured so that the receiving labels 20 may be reprinted if, for example, the receiving labels 20 become damaged.

If the package 17, payload, and/or article is not flagged in the database ("No" branch of decision block 78), the shipping management application may omit printing of the receiving labels 20. The number and type of receiving labels 20 generated may vary depending on the configuration of the package 17. For example, a package 17 containing a single payload, or multiple payloads that do not have individual handling instructions, may be provided with a single receiving label 20 affixed to the outside of the package 17. Packages 17 containing payloads and/or articles that are to be stored in different locations, or that otherwise require different handling, may have additional labels affixed to the payloads and/or articles in the package 17. These additional receiving labels 20 may provide unique identifiers that are associated with instructions in the database 50 specific to the payload and/or article to which they are attached. In any case, in block 82 the package 17 is shipped to the recipient.

Figure 5:
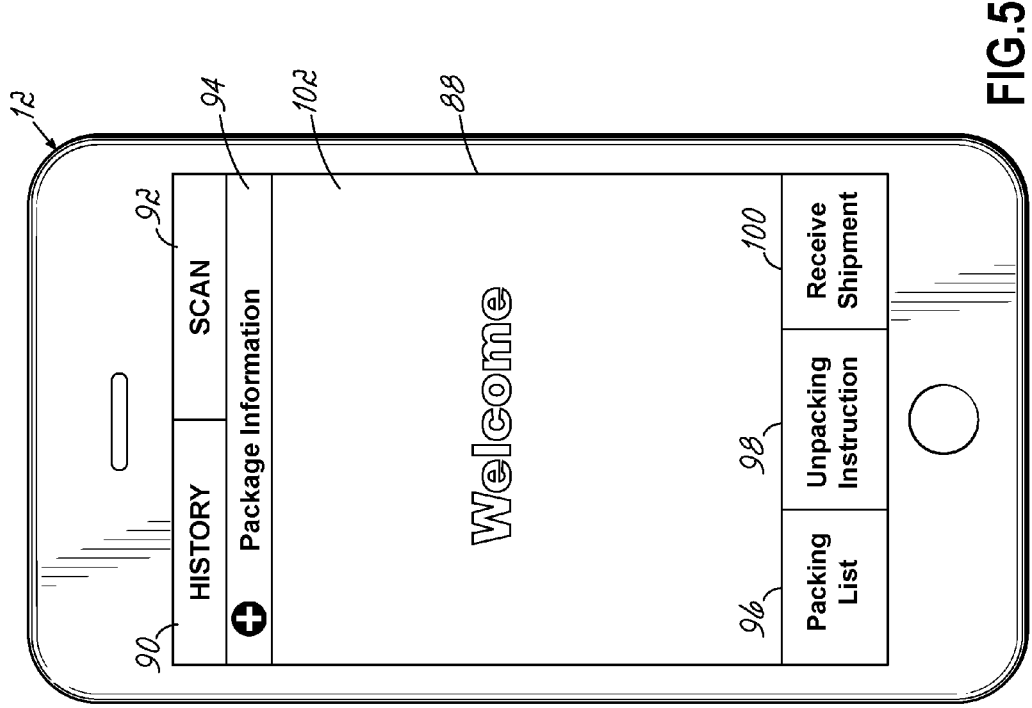
FIG. 5 is a diagrammatic view of an exemplary screen shot of the computing device of FIG. 1 showing a welcome screen displayed by the application.
Figure 4:
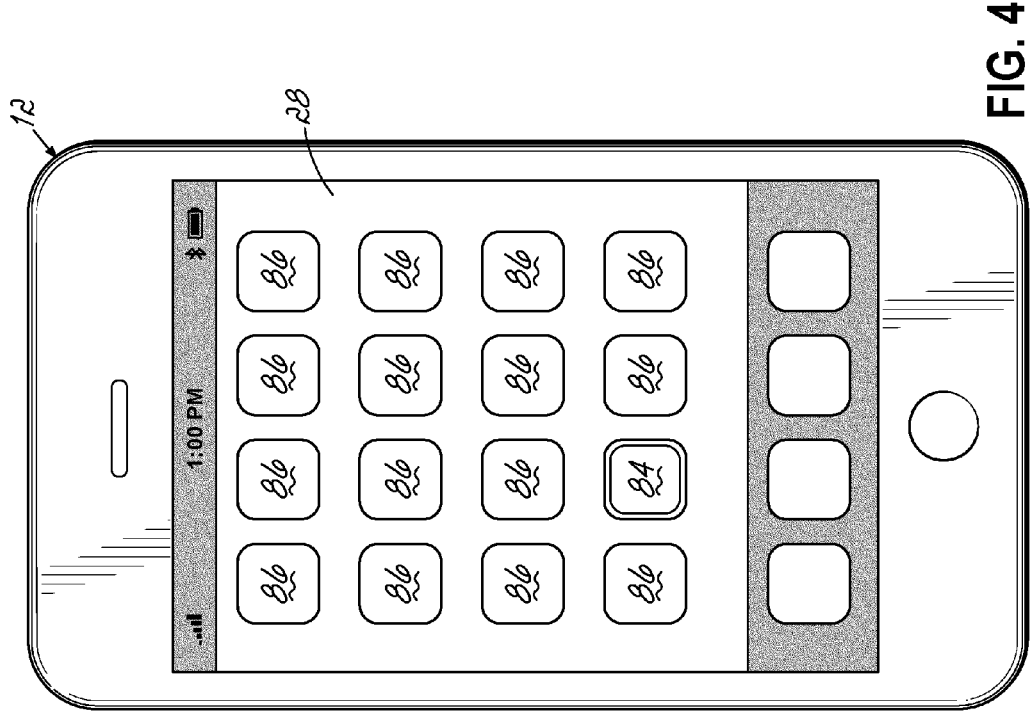
FIG. 4 is a diagrammatic view of an exemplary screen shot of the computing device of FIG. 1 showing an icon for activating an application.

Referring now to FIGS. 4 and 5, in which like reference numerals refer to like features in FIG. 1, an exemplary computing device 12 is illustrated as a smart phone on which the application 34 has been installed. The application 34 may be installed, for example, by downloading the application 34 from a network node, such as a web server. Once installed on the computing device 12, the application 34 may be accessed via an application icon 84, which may be displayed on the human-machine interface 28 (e.g., a touch screen) of computing device 12 along with additional icons 86 that provide access to other applications on the computing device 12.

In response to activation of the application icon 84, the application 34 may display a start-up screen 88 that includes a scan history button 90, a scan button 92, a package information button 94, a packing list button 96, an unpacking instructions button 98, a receive shipment button 100, and a data display window 102. In the illustrated embodiment, the buttons 90, 92, 94, 96, 98, 100 may comprise a main menu that is displayed on all screens presented by the application 34. The main menu may thereby enable the computing device user to toggle between information quickly regardless of their location in the application 34. The data displayed in the data display window 102 may depend on which button 90, 92, 94, 96, 98, 100 is activated. In an embodiment of the present invention, the application 34 may start up in a scan mode. In the scan mode, the data display window 102 may display images that are currently being captured by a built-in camera of the computing device 12 to facilitate aiming the computing device 12 at the receiving label 20.

Figure 6:
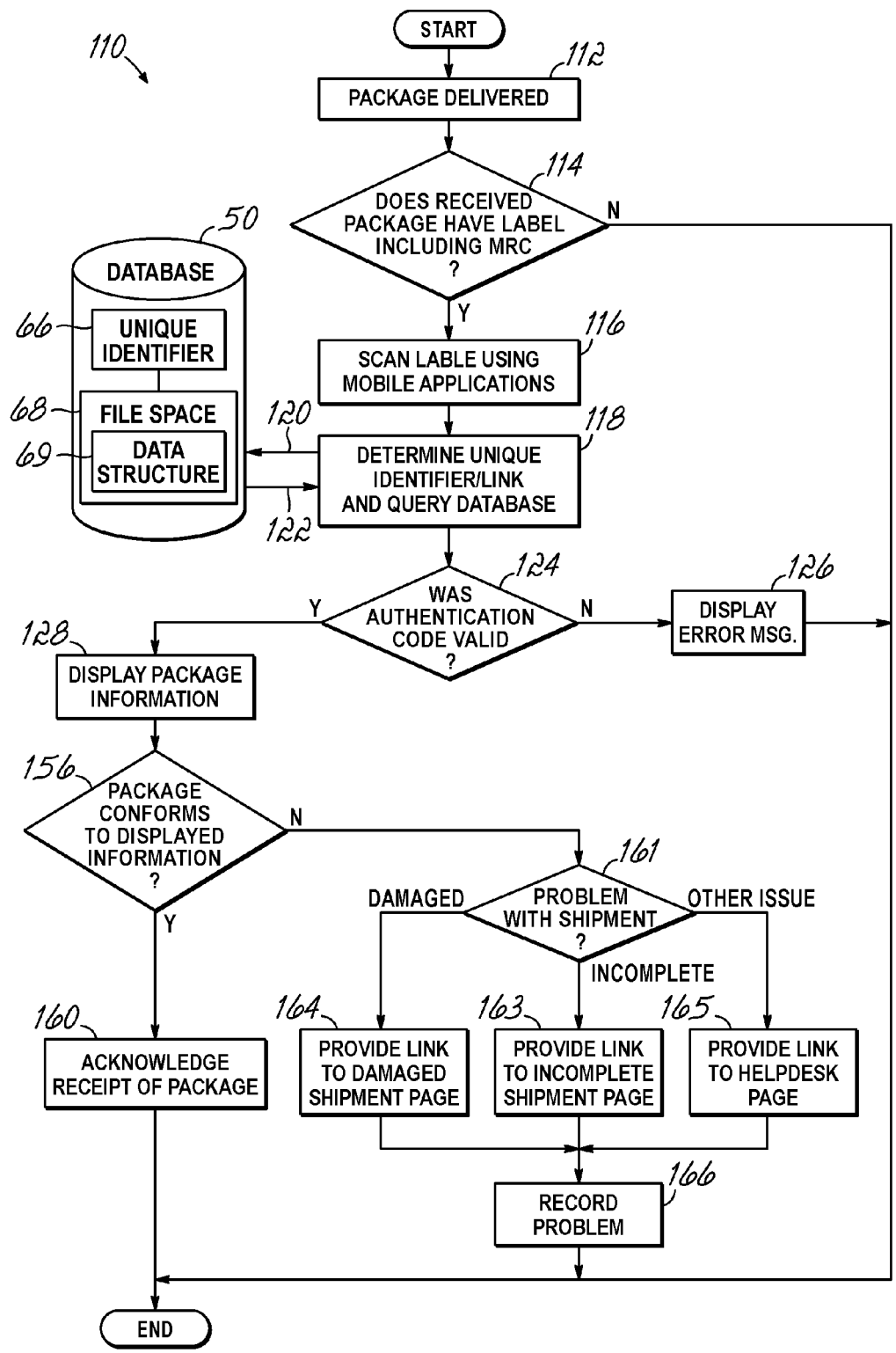
FIG. 6 is a flow chart illustrating an exemplary process for receiving the package in FIG. 1, and for retrieving the data from the database of FIG. 3 based on the unique identifier.

Referring now to FIG. 6, in which like reference numerals refer to like features in FIG. 1, a flow chart 110 is presented that illustrates an exemplary process by which the package 17 may be received at a clinical investigation facility. In block 112 the package 17 is delivered to the clinical investigation facility. The package 17 may be delivered as part of a shipment for a clinical study, or as part of a routine daily drop-off by a shipping company or the U.S. Postal Service. In block 114, a system user receiving the package 17 may determine if the package 17 includes a receiving label 20 having the machine readable code 21. If the package 17 does not have the receiving label 20 ("No" branch of decision block 114), the package 17 may be received using the clinical investigation facility's conventional package receiving process. If the package 17 does include the receiving label 20 ("Yes" branch of decision block 114), the process may proceed to block 116.

Figure 7:
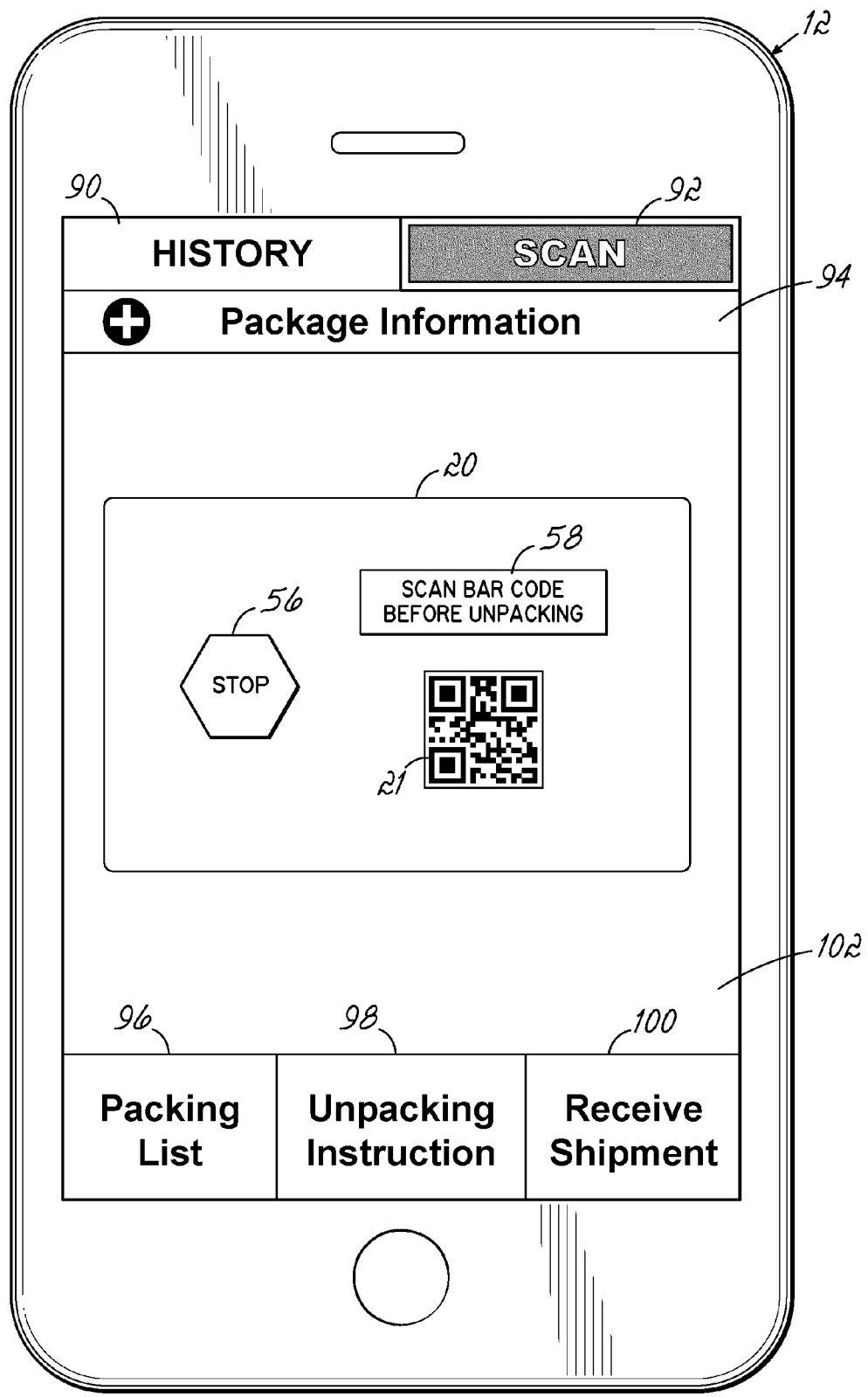
FIG. 7 is a diagrammatic view of an exemplary screen shot of the computing device of FIG. 1 showing a scanning screen displayed by the application.

Referring now to FIG. 7, in which like reference numerals refer to like features in FIG. 5, and with continued reference to FIG. 6, in block 116, the user may begin the process of scanning the receiving label 20 by activating the application icon 84, or if the application 34 is already running, the scan button 92. In response to activation of the application icon 84 or scan button 92, the application 34 may open a screen in the data display window 102 that enables the user to scan the machine readable code 21. The application 34 may use the built-in camera of the computing device 12 as the scanning device 30 to "scan" the machine readable code 21. As depicted in FIG. 7, to assist the recipient in capturing an image of the receiving label 20, the application 34 may display images currently being captured by the built-in camera in the data display window 102. The display may also include on-screen instructions instructing the user to point the camera at the machine readable code 21 and take a picture. In response to the recipient providing an indication that the machine readable code 21 is suitably framed in the camera (e.g., by tapping the data display window 102 or scan button 92), the application 34 may capture the displayed image. The application 34 may then identify the machine readable code 21 in the captured image and extract the data contained therein.

In response to scanning the receiving label 20, the process may proceed to block 118. In block 118, the application 34 determines the unique identifier 66 and the data identifying the link to the file space 68 based on data extracted from the machine readable code 21. The application 34 may then transmit a query 120 including the unique identifier 66 to the database 50. This query may be transmitted over the link identified by the link identifying data extracted from the machine readable code 21. In an embodiment of the present invention, the application 34 may be configured to direct all communication with the system 10 through the database 50. The database 50 may thereby prevent a person who has hacked the application 34 from having direct access to the entire system 10.

In response to receiving the query 120, the database 50 may determine if the unique identifier includes a valid authorization code. If the authorization code is valid, the database 50 may proceed to identify the file space 68 associated with the package 17 and transmit a response 122 to the computing device 12. In an alternative embodiment, the response 122 may be transmitted to some other suitable data receiving device, such a desktop computer. In other words, it is contemplated that the data receiving device may comprise the mobile scanning device, or alternatively, the data receiving device may comprise a computing device independent of the scanning device. The response 122 may include information relating to the package 17, which may be stored as one or more data structures 69 in the file space 68. This data may include, for example, clinical protocol data, a shipment number, a control/client order number, a shipment address, packing list information (e.g., a description and quantity of each payload and/or article in the package 17, as well as lot and part numbers, if applicable), storage requirements, and detailed unpacking instructions.

The database 50 may also record use of the application 34 to scan the receiving labels 20. The database 50 may thereby build a record that can be used to track metrics relating to use of the application 34. Data stored in this application record may include data relating to use of the application 34 for a specific shipment, package 17, payload, and/or article, the date and time the receiving labels 20 was scanned, a location of the computing device 12 at the time of the scan, as well as IP Addresses and MAC addresses of the computing device 12 and any intervening network nodes.

If the authorization code is not valid, the database 50 may transmit a response 122 to the application 34 indicating that an error has occurred. The database 50 may also record the occurrence of the error in an error table. This error table may be maintained separately from a table of successful scans to facilitate tracking of errors. The error table may, for example, be used to provide an alerting feature that alerts a support team when an error occurs more than predetermined number of times, which could indicate an attempt to access clinical trial data by an unauthorized party.

In an alternative embodiment of the invention, the application 34 may be configured to determine if the machine readable code 21 contains valid data based on an internal analysis prior to sending the query 120. This alternative embodiment may thereby reduce traffic between the computing device 12 and database 50. In any case, in response to receiving the response 122, the application 34 may proceed to block 124.

Figure 8:
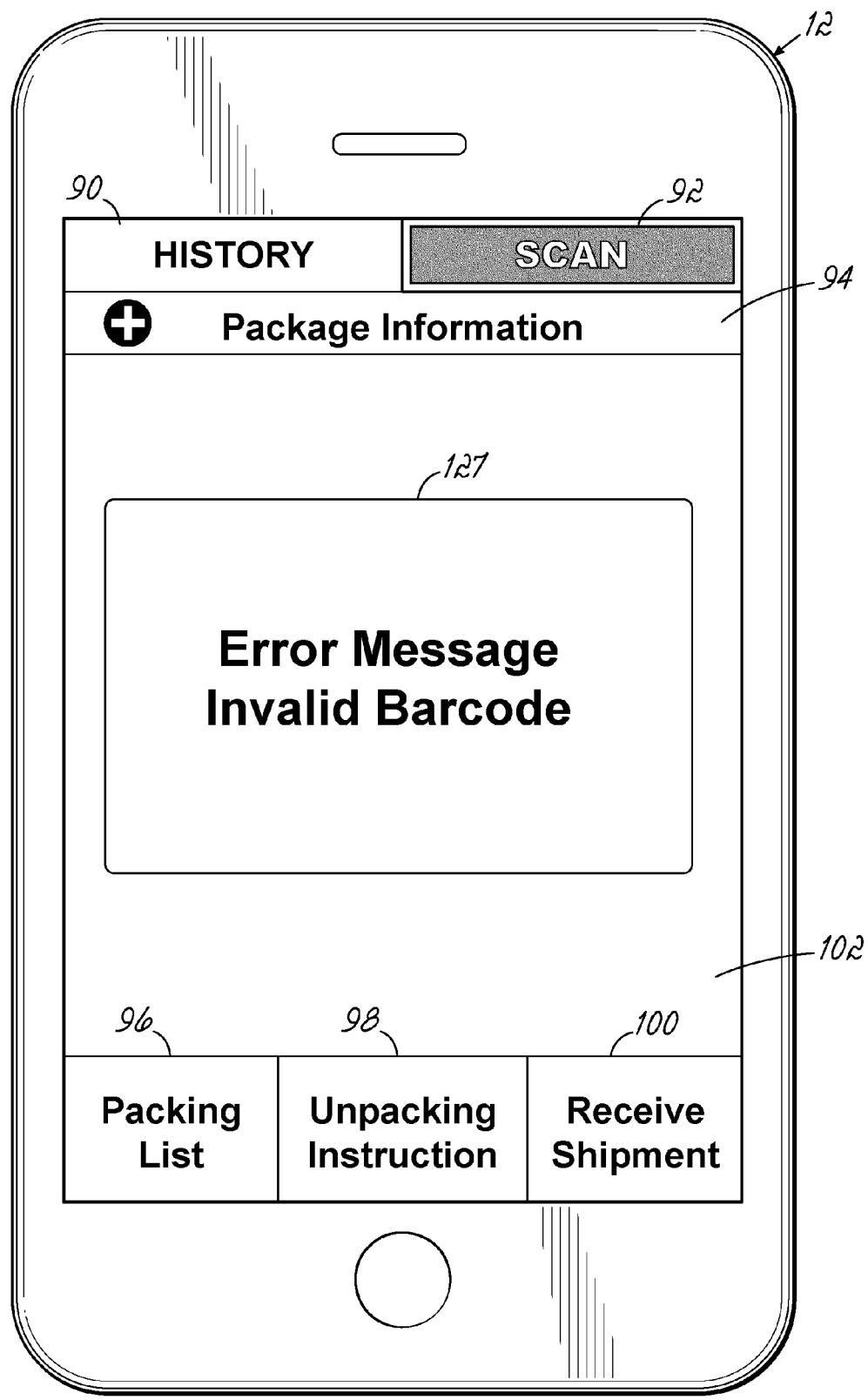
FIG. 8 is a diagrammatic view of an exemplary screen shot of the computing device of FIG. 1 showing an error message displayed by the application.

Referring now to FIG. 8, in which like reference numerals refer to like features in FIG. 7, and with continued reference to FIG. 6, in block 124, the application 34 may determine if the authentication code is valid based on either the response 122 received from the database 50, or on the internal analysis of the data received from the machine readable code 21. In either case, if the authorization code is not valid ("No" branch of decision block 124), the application 34 may proceed to block 126. In block 126, the application 34 may display an error message 127 indicating that the machine readable code 21 contained invalid data. Invalid data may include, for example, an authorization code that does not match the authorization code in the database 50. The application 34 may also display an error message if the application has not yet been enabled for the clinical study (e.g., the clinical study has not been activated in the system), the application 34 was unable to establish contact with the database 50, or for any other suitable reason. By requiring that the authentication code transmitted to the database 50 match the authentication code in the database 50, the system 10 may make it difficult for a user to access study or package data in the database 50 unless they have the package 17 in their possession.

Referring now to FIGS. 9-13D, in which like reference numerals refer to like features in FIG. 8, and with continued reference to FIG. 6, if the authorization code is determined to be valid ("Yes" branch of decision block 124), the application 34 may proceed to block 128. In block 128, the application 34 may display information relating to the package 17. This information may include data residing in the file space 68 that was included in the response 122, data extracted directly from the machine readable code 21, data retrieved from some other location (e.g., a web site), or any other data relating to the package 17 that is accessible by the computing device 12. As depicted in FIGS. 9-13D, this data may be selectively displayed in the data display window 102 as text, images, or in any other suitable form based on which button 90, 94, 96, 98, 100 is activated by the user.

Figure 9:
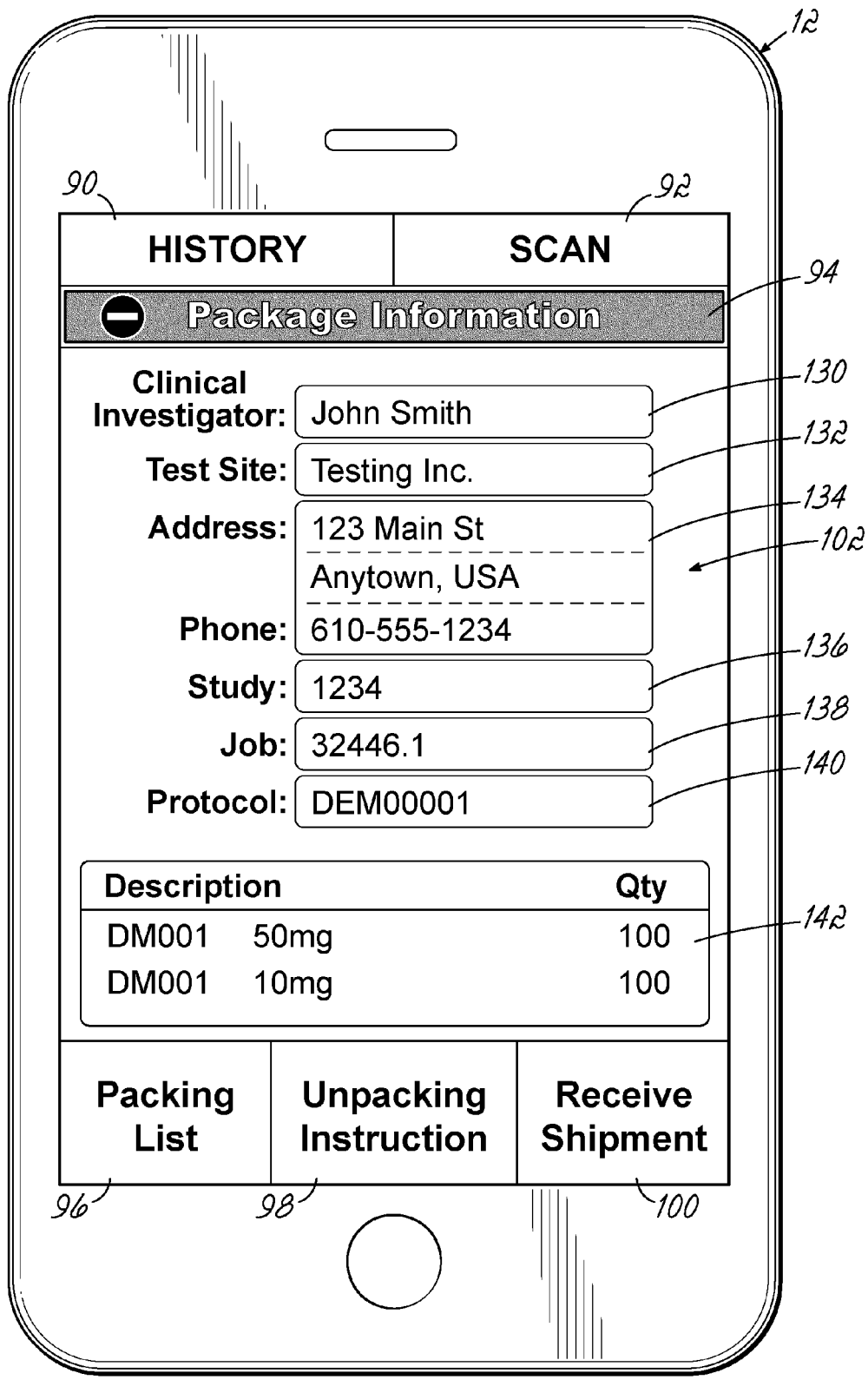
FIG. 9 is a diagrammatic view of an exemplary screen shot of the computing device of FIG. 1 showing a package information screen displayed by the application.

As depicted in FIG. 9, in response to activation of the package information button 94, the application 34 may display data relating to the package 17. This data may include data relating to a clinical study to which the articles in the package 17 are related. To this end, and as shown in the exemplary embodiment, the data may include the name of a clinical investigator 130, an identity of a test site or testing facility 132 that is performing the clinical study, contact information 134 for the clinical investigator 130 and/or testing facility 132, a clinical study number 136, a job number 138, a protocol number 140, and a description 142 of samples included in the package 17. The package information may also include a warning if special storage conditions are required for any of the contents of the package 17. Advantageously, this data may facilitate delivery of the package 17 to the correct person or area based on the clinical investigator, the clinical study, and/or the testing facility. The displayed data may also facilitate placing any payloads and/or articles in the package 17 that require special storage conditions in an appropriate storage location (e.g., a refrigerator) in a timely manner.

Figure 10:
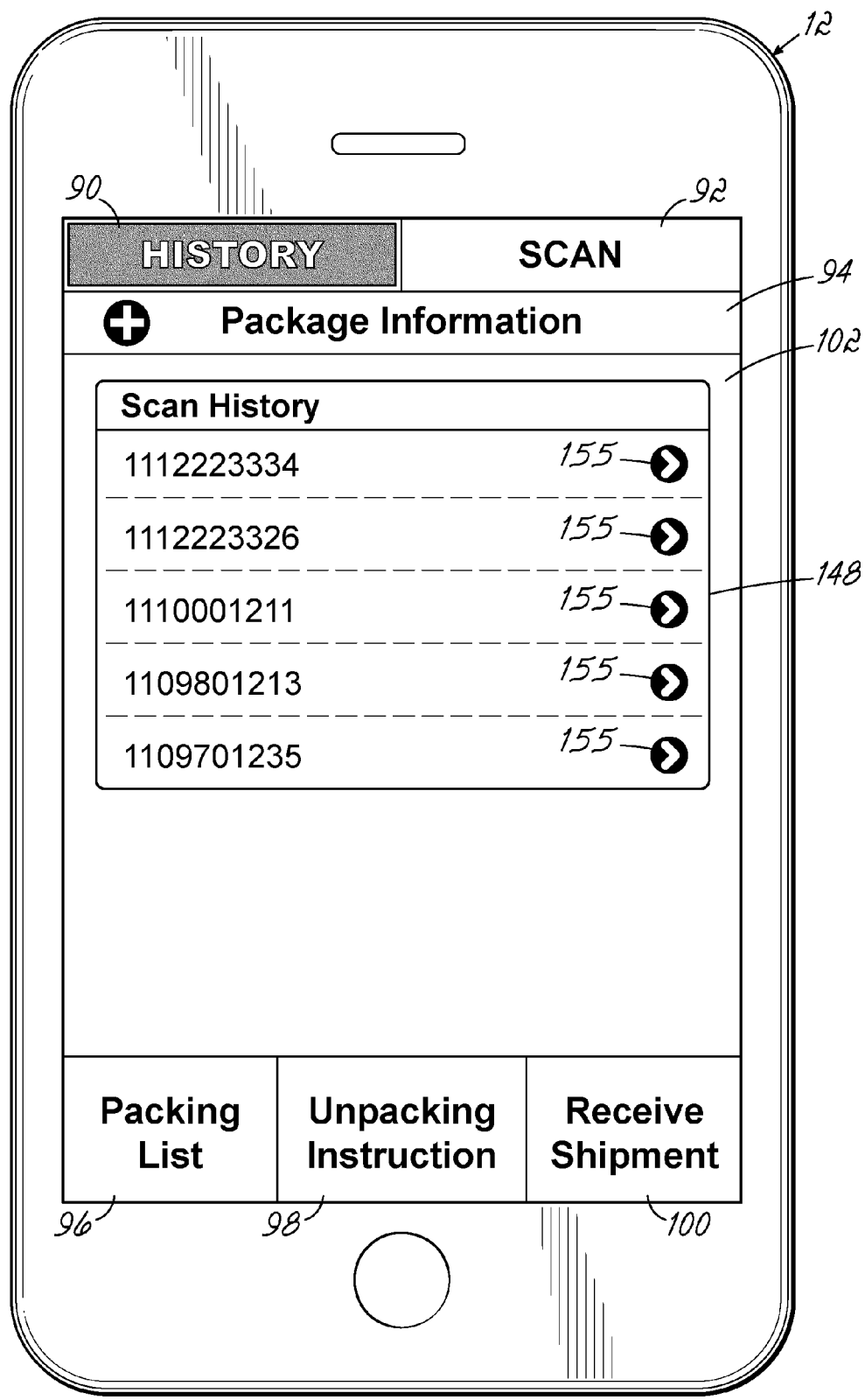
FIG. 10 is a diagrammatic view of an exemplary screen shot of the computing device of FIG. 1 showing a scan history screen displayed by the application.
Figure 11:
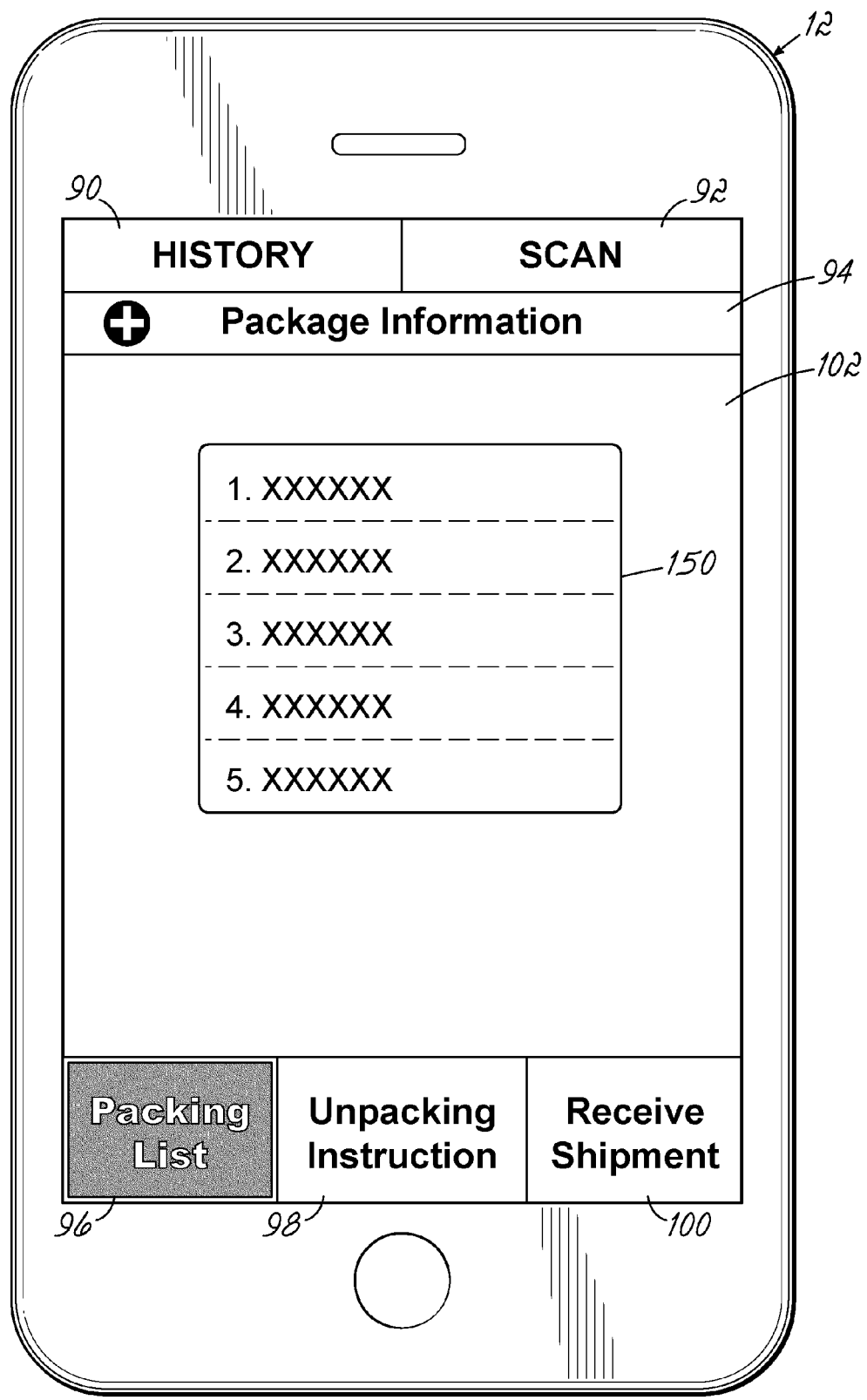
FIG. 11 is a diagrammatic view of an exemplary screen shot of the computing device of FIG. 1 showing a packing list screen displayed by the application.
Figure 12:
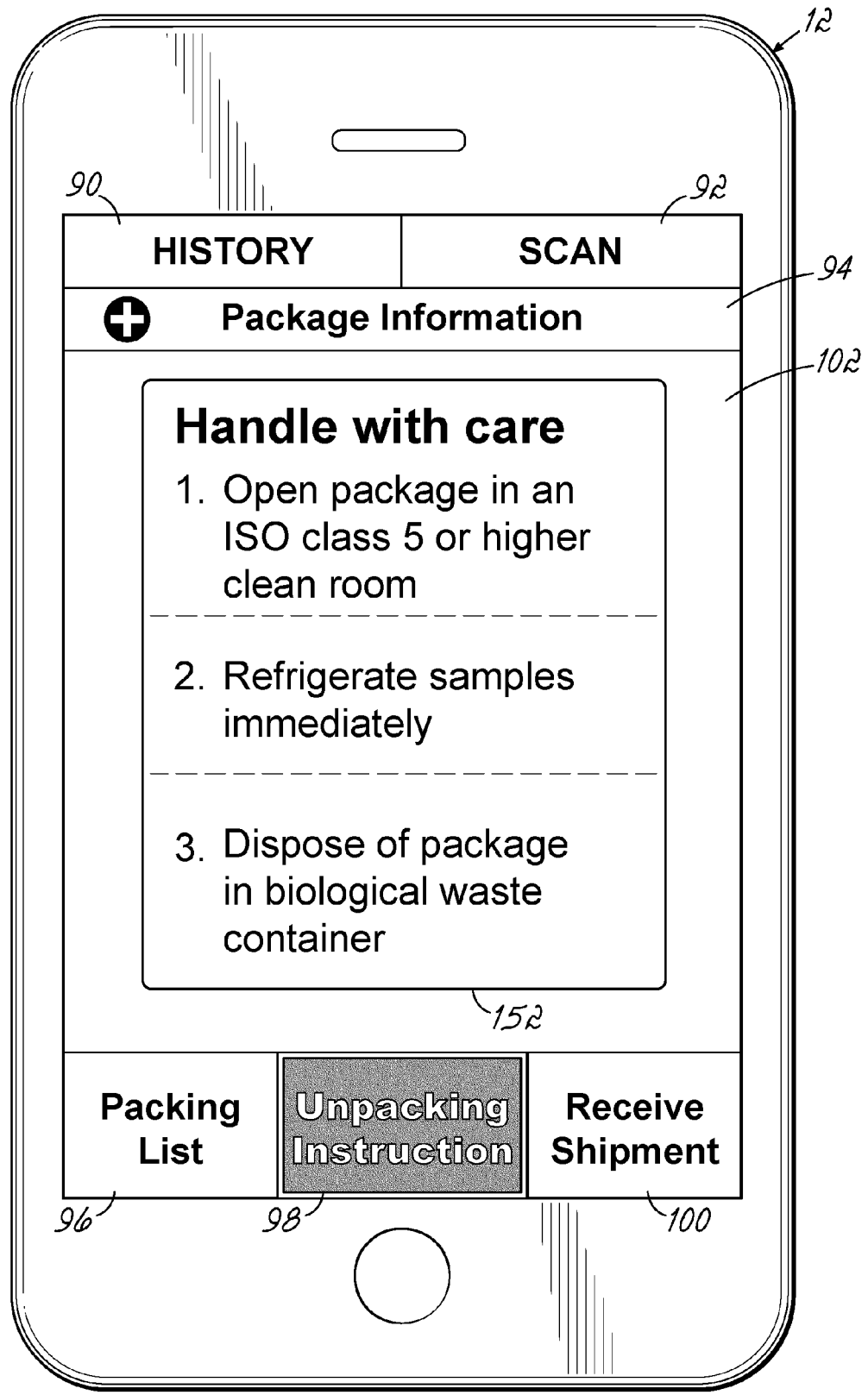
FIG. 12 is a diagrammatic view of an exemplary screen shot of the computing device of FIG. 1 showing an unpacking instructions screen displayed by the application.
Figure 13A:
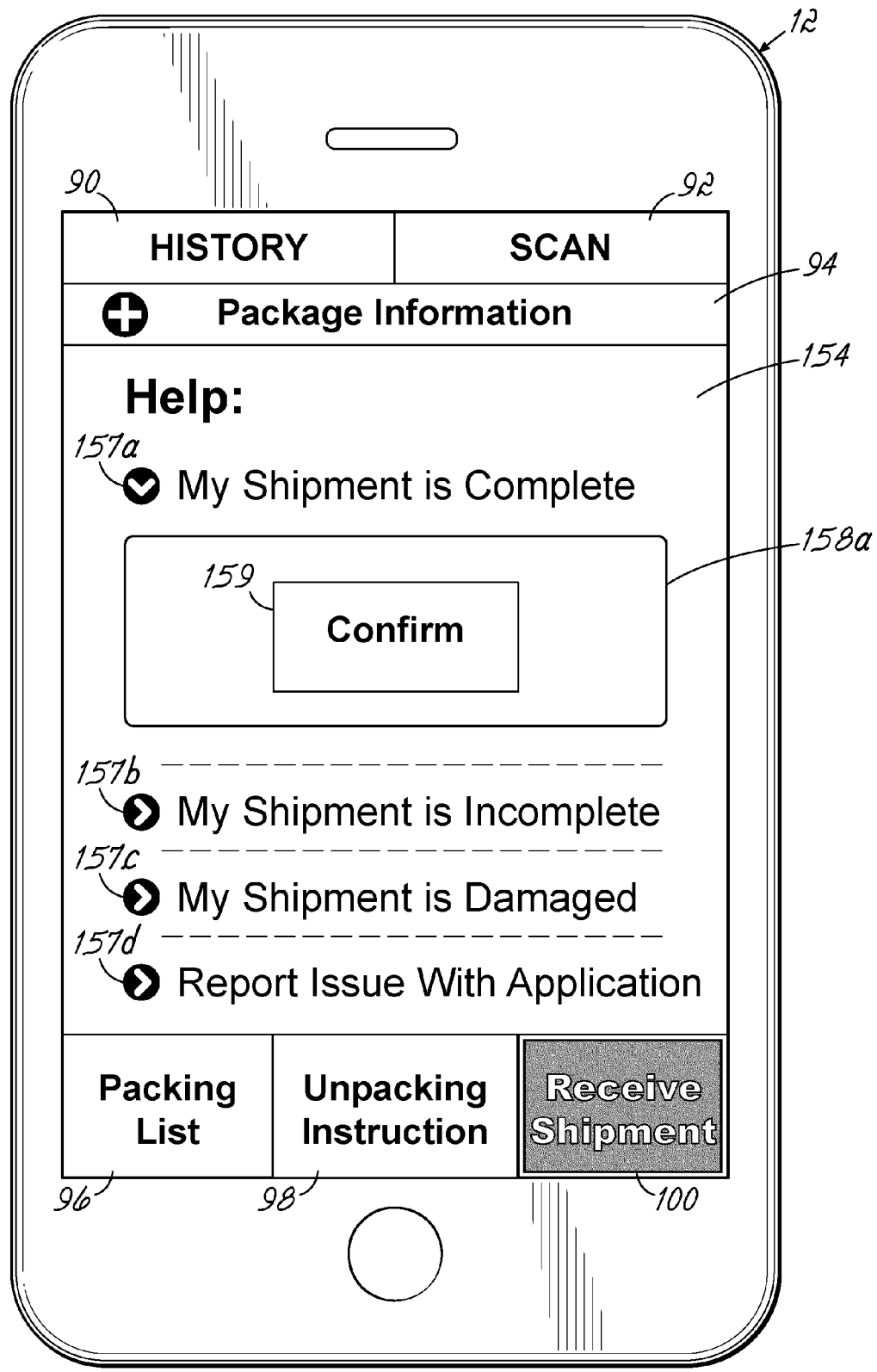
FIG. 13A is a diagrammatic view of an exemplary screen shot of the computing device of FIG. 1 showing a drop-down window displayed by the application for confirming receipt of a shipment.
Figure 13B:
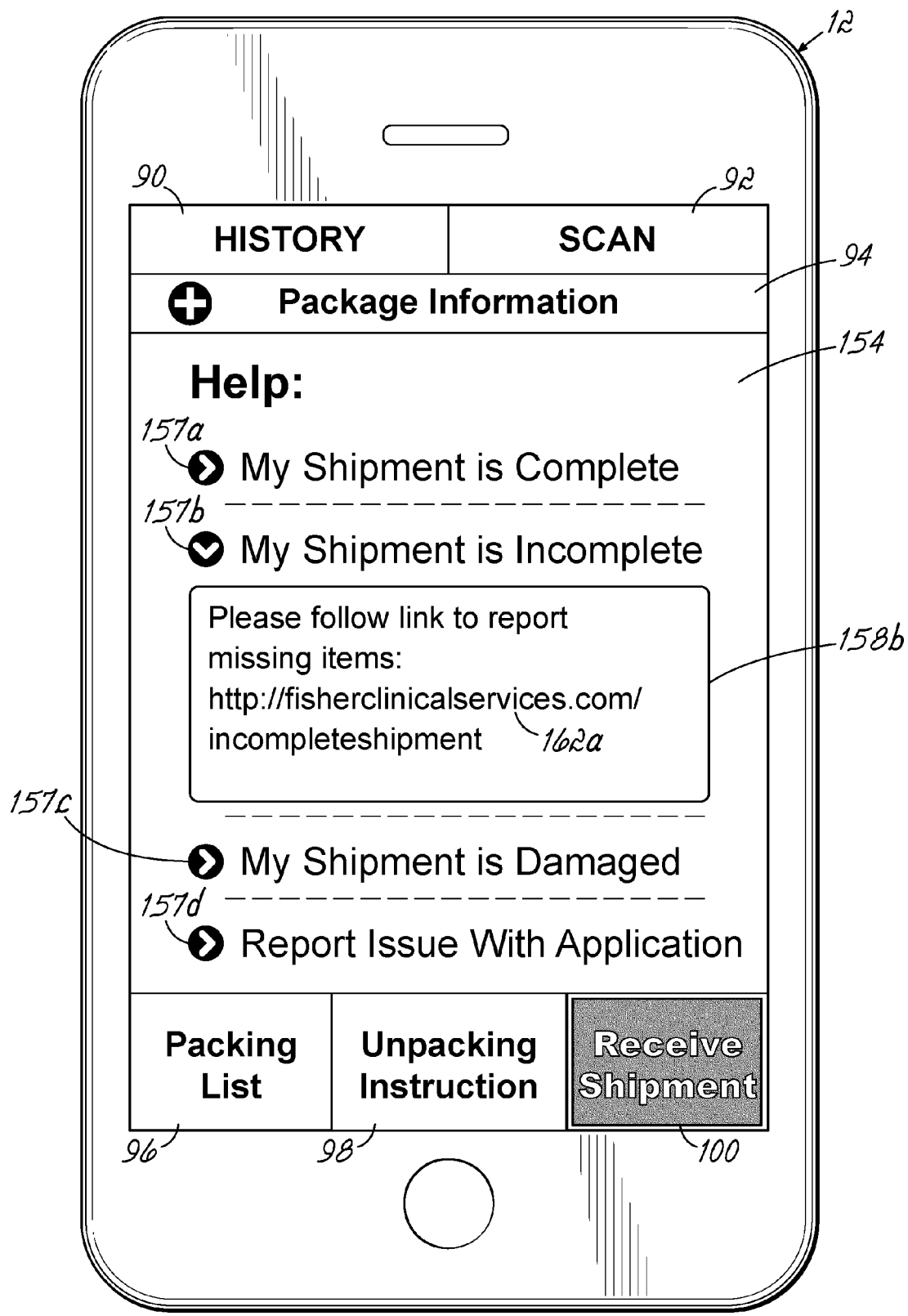
FIG. 13B is a diagrammatic view of an exemplary screen shot of the computing device of FIG. 1 showing a drop-down window displayed by the application for reporting a missing article from the shipment.
Figure 13C:
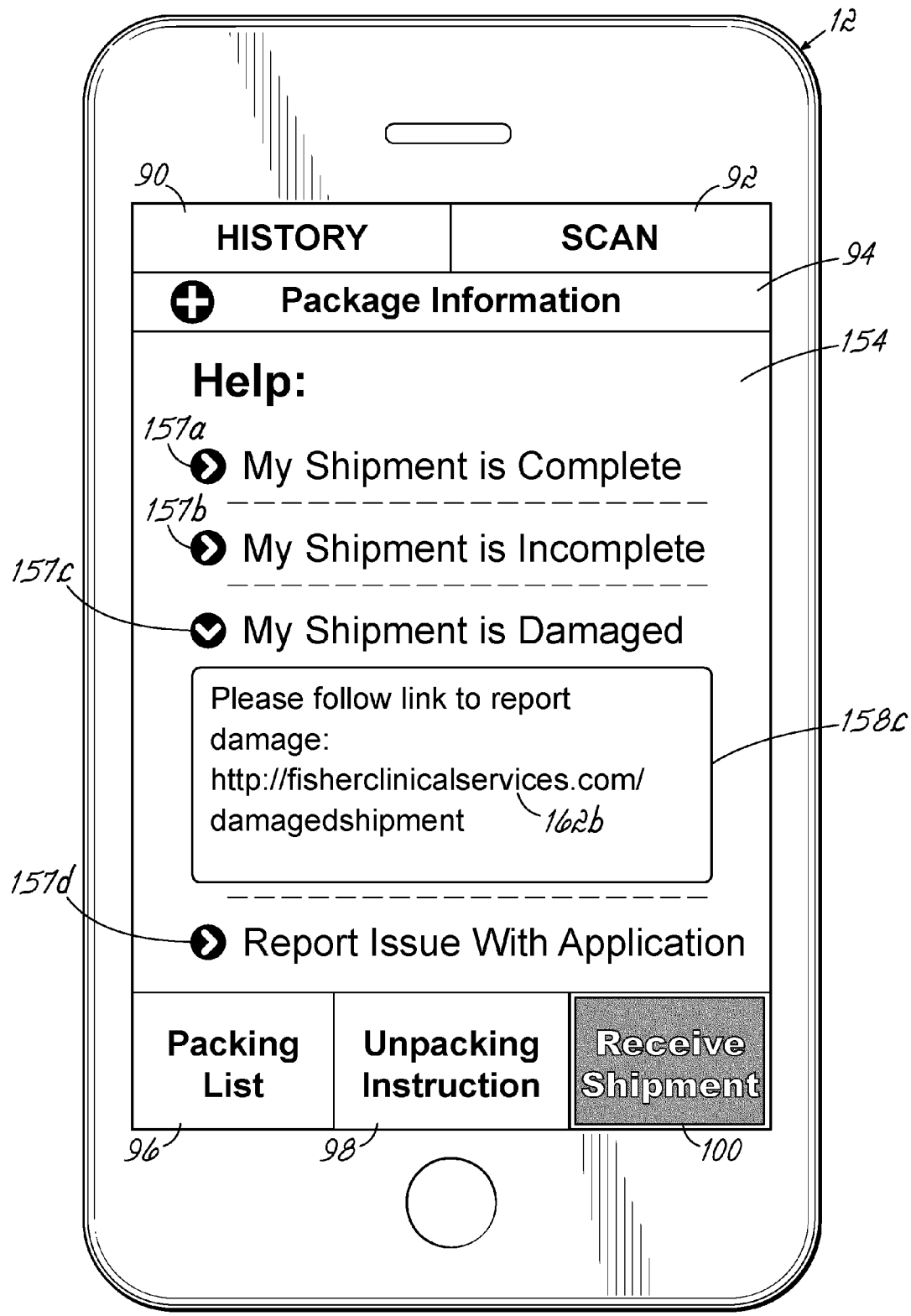
FIG. 13C is a diagrammatic view of an exemplary screen shot of the computing device of FIG. 1 showing a drop-down window displayed by the application for reporting a damaged article from the shipment.
Figure 13D:
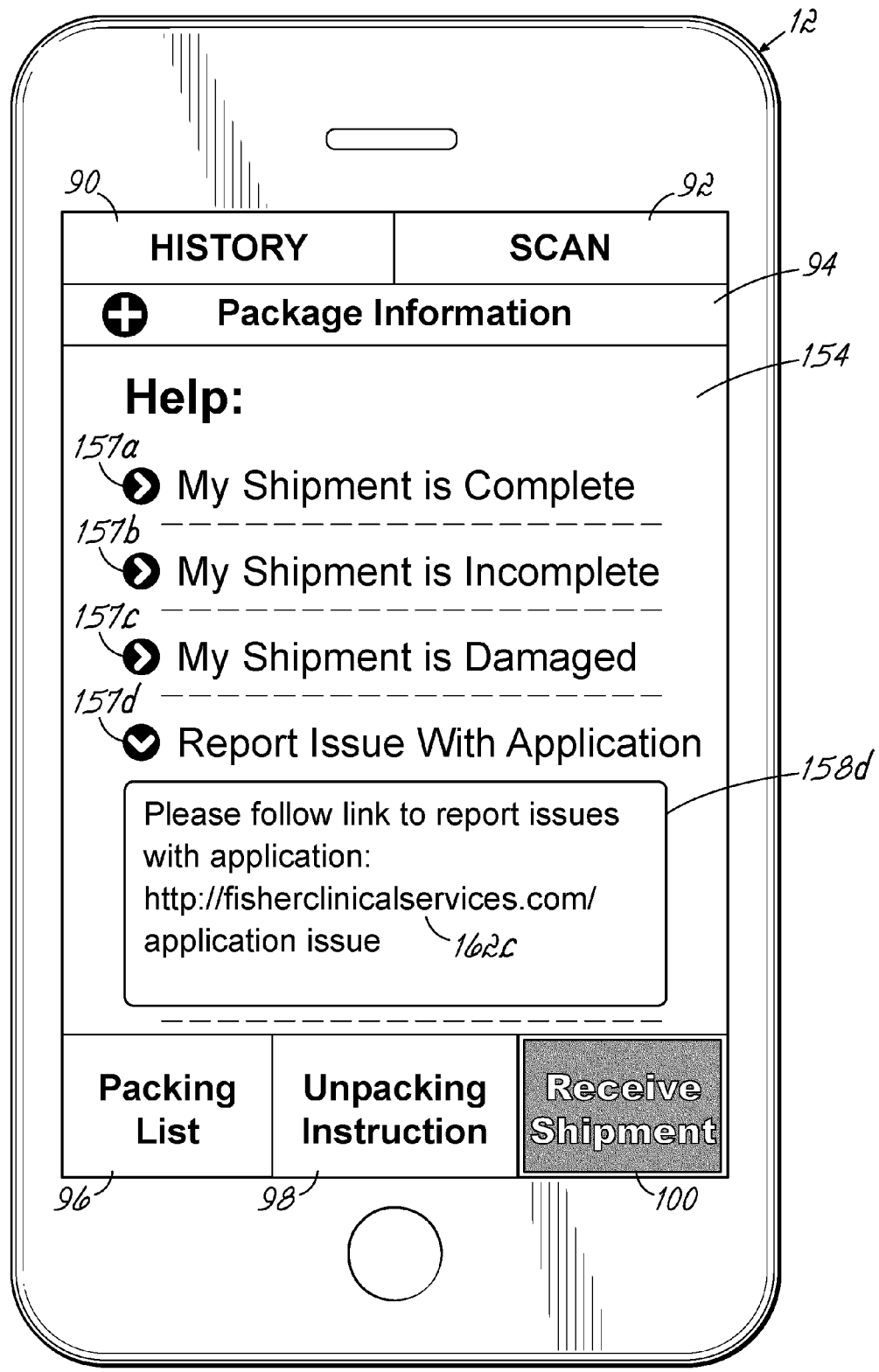
FIG. 13D is a diagrammatic view of an exemplary screen shot of the computing device of FIG. 1 showing a drop-down window displayed by the application for reporting an issue with the application.

In a similar fashion, in response to activation of other main menu buttons 90, 96, 98, 100, the application 34 may display a list of previously scanned packages 148 (as depicted in FIG. 10), a packing list 150 (as depicted in FIG. 11), unpacking instructions 152 (as depicted in FIG. 12), and a receive shipment window 154 (as depicted in FIGS. 13A-13D). In an embodiment of the present invention, the list of previously scanned packages 148 may include buttons 155 that activate drop-down windows for displaying data. The user may thereby selectively display data relating to previously scanned packages 17 by activating the button 155 corresponding to the package of interest. The scanning history data may be stored in the database 50, and may be retrieved by the application 34 in response to activation of the scan history button 90 or drop-down window button 155.

Referring now to FIGS. 13A-13D with continued reference to FIG. 6, in block 156 the application 34 may determine if the shipment was received intact. This determination may be in response to the user indicating that the shipment was not received intact, or that there is a problem with the shipment, such as missing and/or damaged articles. To enable the user to provide the application 34 with this information, the receive shipment window 154 may include one or more buttons 157a-157d that selectively activate corresponding drop-down windows 158a-158d. The drop-down windows 158a-158d may in turn provide the user with options of either confirming the shipment is intact, identifying a problem with the shipment, or identifying a problem with the application. For example, activating drop-down window 158a may cause the application to display a confirm button 159. If the user determines that the package 17 conforms to the data displayed by the application 34, the user may activate the confirm button 159. In response to receiving the user's indication that the package conforms to the displayed information ("Yes" branch of decision block 156), the process may proceed to block 160 and record that the package was received intact. This information may be recorded in the database 50, and used to facilitate tracking of, and billing for, the package 17 and/or the contents thereof.

If the user indicates the package 17 does not conform to the displayed data ("No" branch of decision block 156), the process may proceed to block 161 and determine the type of problem. If the user determines the shipment is incomplete, the user may activate a drop-down window 158b by selecting the corresponding button 157b. In response to the user activating the drop-down window 158b ("Incomplete" branch of decision block 161), the application 34 may proceed to block 163 and display a link 162a in the drop-down window 158b. In response to the user selecting the link 162a, the application 34 may display a data entry page (not shown) that displays the packing list and allows the user to indicate which articles in the packing list are missing. The application 34 may thereby enable the user to provide data indicating which articles are missing from the package 17.

In response to the user activating the drop-down window 158c ("Damaged" branch of decision block 161), the application 34 may proceed to block 164 and display a link 162b in the drop-down window 158c. In response to the user selecting the link 162b, the application 34 may display a data entry page (not shown) that displays the packing list and allows the user to enter data describing the damage (e.g., environmental monitoring unit indicates temperature exceeded allowable threshold). The application 34 may thereby enable the user to provide data indicating which articles are damaged, and the nature of the damage.

In response to the user activating the drop-down window 158d ("Other Issue" branch of decision block 161), the application 34 may proceed to block 165 and display a link 162c in the drop-down window 158d. In response to the user selecting the link 162c, the application 34 may display a helpdesk page (not shown) that allows the user to enter data describing the problem (e.g., environmental monitoring unit will not upload data to computing device 12). In any case, in response to the user identifying the problem, the application 34 may proceed to block 166 and record the problem. In an embodiment of the invention, the problem may be recorded by the application 34 transmitting data entered by the user to the database 50.

Figure 14:
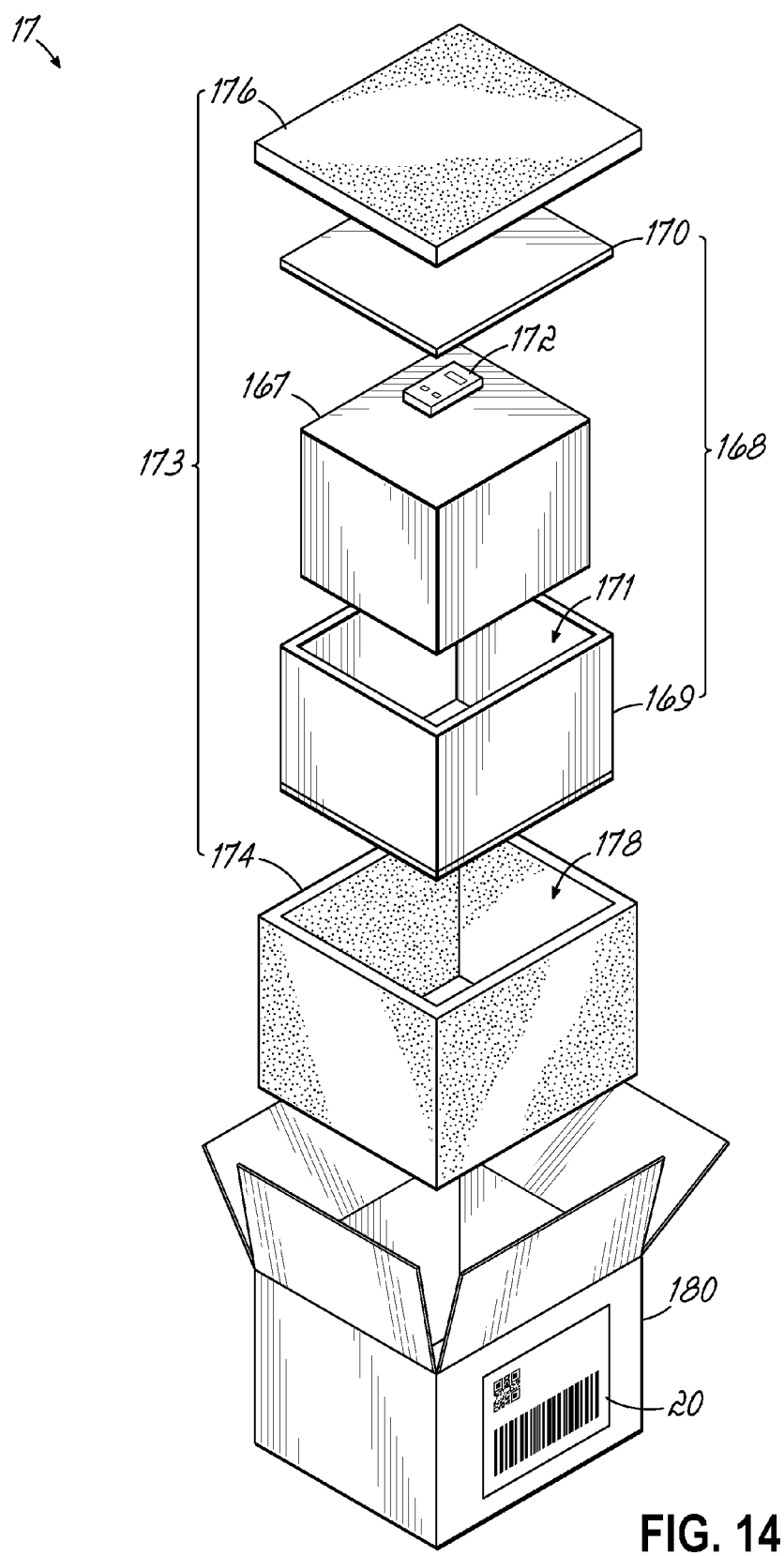
FIG. 14 is an exploded perspective view of the exemplary package of FIG. 1 with a single payload.

Referring now to FIG. 14, in which like reference numerals refer to like features in FIG. 1, an exploded perspective view of an exemplary package 17 is provided. The package 17 includes a payload 167, which may be a container of articles that require a temperature controlled environment to remain viable or in a proper metabolic state. The payload 167 may be placed in a cooling assembly 168 that includes an open sided container 169 and a top panel 170. When assembled, the cooling assembly 168 may define a cavity 171 that is configured to accept the payload 167. The cooling assembly 168 may include a phase-change material, such as water, that absorbs heat from and/or releases heat to the surrounding environment so as to maintain the temperature of the cavity 171 within a desired range near the phase change point. For example, a mixture including water in both liquid and solid phases may tend to maintain a temperature of 0° C. within the cooling assembly 168. To monitor the temperature of the payload 167, an environmental monitoring unit 172 may be placed inside the cavity 171.

The payload 167 and cooling assembly 168 may be placed in an insulating assembly 173 that includes an open ended container 174 and top panel 176 formed from an insulating material, such as a closed-cell extruded polystyrene foam. Similarly to the cooling assembly 168, the insulating assembly 173 may define a cavity 178 configured to accept the cooling assembly 168. The assembled payload 167, cooling assembly 168, and insulating assembly 173 may then be placed in a suitable outer container 180, such as a corrugated fiberboard box, for shipping. The package 17 may thereby be configured to maintain a payload temperature within a desired range of temperatures for a desired amount of time. Prior to shipping the package 17, the receiving label 20 may be affixed to the outer container 180 in accordance with the embodiments of the present invention described above.

At the receiving end of the shipment, a user who wishes to unpack the package 17 may activate the application icon 84 and scan the receiving label 20 using the computing device 12. In response to scanning the receiving label 20, the application 34 may receive data relating to the package 17 from the database 50 that includes unpacking instructions. Advantageously, by providing the instructions to the user via the computing device, the user may receive unpacking instructions prior to opening the package 17, rather than having to open at least the outer container 180 to retrieve printed instructions.

Referring again to FIG. 12, if the package 17 conforms to the data displayed by the application 34, the user may wish to unpack the package 17. To access unpacking instructions, the user may activate the unpacking instructions button 98. In response to activation of the button 98, the application 34 may display the unpacking instructions 152 in the data display window 102. The unpacking instructions 152 may include both text and images, and may define a proscribed way of unpacking the package 17. To this end, the instructions may include steps that describe where articles within the package 17 are placed relative to one another, as well as a recommended unpacking order. For example, the unpacking instructions 152 may dictate that articles which need refrigeration are to be unpacked first and immediately placed in a refrigerator at a particular temperature. The unpacking instructions 152 may also instruct the user how to find, deactivate, and download data from the environmental monitoring unit 172. In an embodiment of the present invention, the instructions may be provided one step at a time, with the user indicating that the displayed step has been completed prior to receiving the next step. The application 34 may thereby track the unpacking process, and provide data to the database indicative of how the unpacking process was conducted. System users or the helpdesk may thereby be able to verify that a package was properly unpacked, or determine if an article was mishandled.

The unpacking instructions feature of the system 10 may facilitate complex payload arrangements in which articles are placed relative to each other so that each article is maintained in a different environment. For example, articles requiring lower temperatures could be arranged near the center of the package 17. Other articles less sensitive to temperature variations could be placed closer to an outer surface of the package 17, such as in a compartment external to the insulating assembly 173. Embodiments of the system 10 may thereby facilitate development of new ways of combining shipments into a single package 17, such as combining ambient and cold chain shipments. Moreover, because the instructions are stored in the database 50, the unpacking instructions may be modified based on the passage of time since the article was shipped. For example, the amount of time the package 17, or an article in the package, can be left unrefrigerated may be adjusted based on the amount of time that has passed since the package 17 was assembled. The unpacking order could also be adjusted base on how long the container has been in transit, or based on a predicted condition of articles in the package. For example, once it is determined that an article in the package 17 has likely gone bad, the unpacking instructions could be adjusted to reflect this determination.

Figure 15:
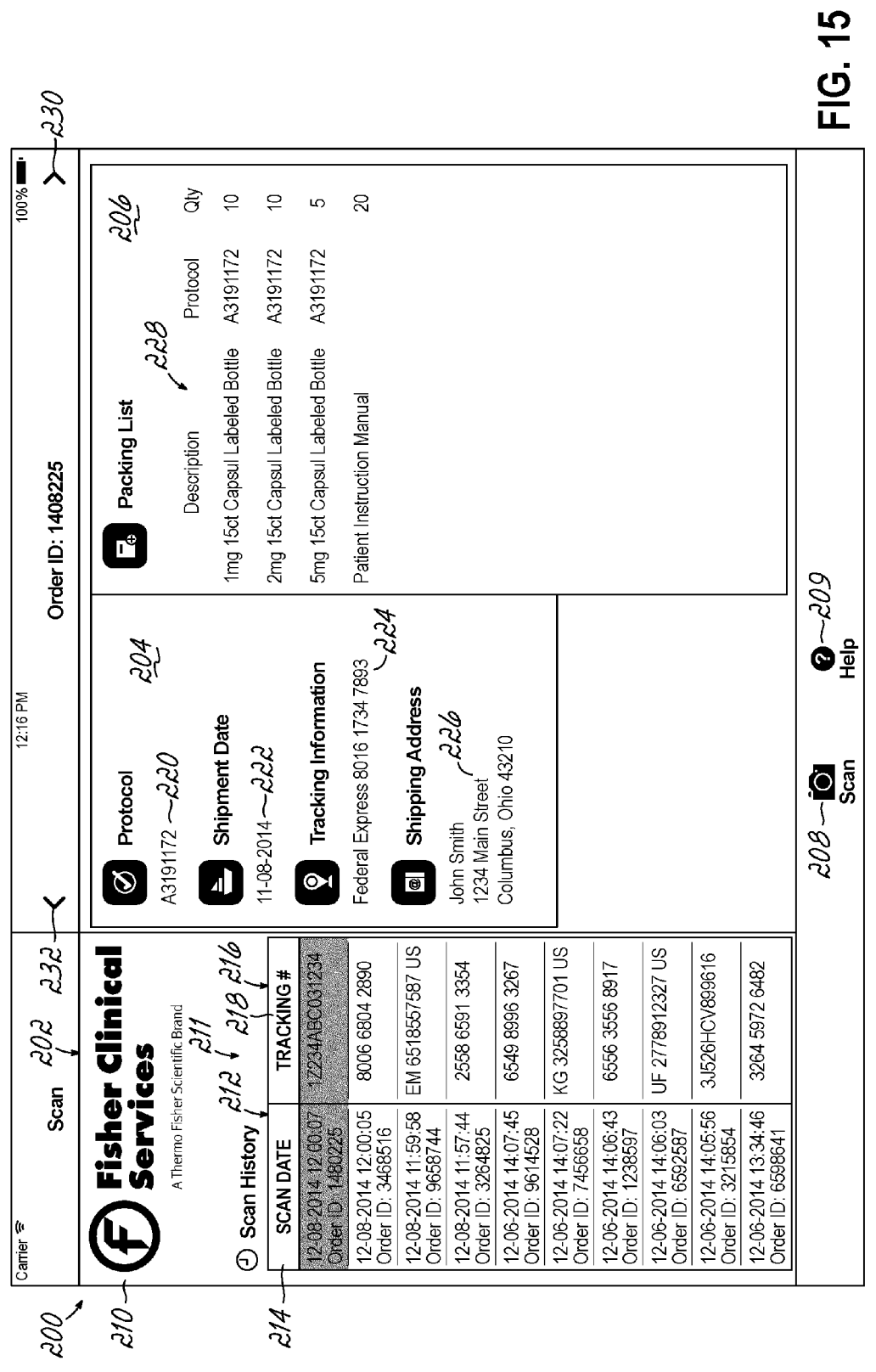

Referring now to FIG. 15, an exemplary user interface 200 that may be displayed on the human-machine interface 28 of computing device 12 by the application 34 is presented in accordance with an alternative embodiment of the present invention. The user interface 200 may include scan history window 202, shipment summary window 204, a packing list window 206, a scan icon 208, and a help icon 209. The scan history window 202 may include a supplier logo 210 and a scan history table 211. The scan history table 211 may include a scan data column 212 having a column header 214, and a tracking number column 216 having column header 218. The scan history table 211 may further comprise a plurality of rows, with each row displaying data relating to a scan performed by the application 34. In response to the user selecting one of the column headers 214, 218, the application 34 may sort the rows of the scan history table 211 based on the data and time of the scan or the tracking number, as the case may be.

To scan in a package 17, the user may activate the scan icon 208. In response to activation of the scan icon 208, the application 34 may scan the machine readable code 21 of receiving label 20 as described above. Based on data obtained by scanning the machine readable code 21, the application 34 may determine an order ID and tracking number for the package 17, and display this information in a new row the scan history table 211. Additional information related to the package 17 and its contents may be displayed in the shipment summary window 204 and packing list window 206. This information may include, but is not limited to, a clinical trial protocol 220, a shipment date 222, a tracking number 224, and a shipping address 226. The packing list window 206 may display a list of articles 228 that should have been included in the package 17. The list of articles 228 may include, for example, a description of the article, the protocol for using the article, and the quantity of the article. The data displayed by the user interface 200 may be contained in the machine readable code 21 (e.g., the tracking number), and/or obtained from the database 50 based on data contained in the machine readable code 21 (e.g., the unique identifier). In an embodiment of the invention, the unique code may be provided by the tracking number.

The user interface 200 may be configured to display data for a particular scanned package 17 in response to the user selecting the row representing the scanned package in the scan history table 211. The user interface 200 may further include a forward button 230 and a reverse button 232. In response to the user to activating these buttons 230, 232, the user interface 200 may display windows that provide different information relating to the package 17. For computing devices 12 having a touch screen, such as a tablet computer, the user interface 200 may be configured to display different windows in response to gesture inputs on the touch screen, such as taps, swipes, slides, or any other suitable gesture.

Figure 16:
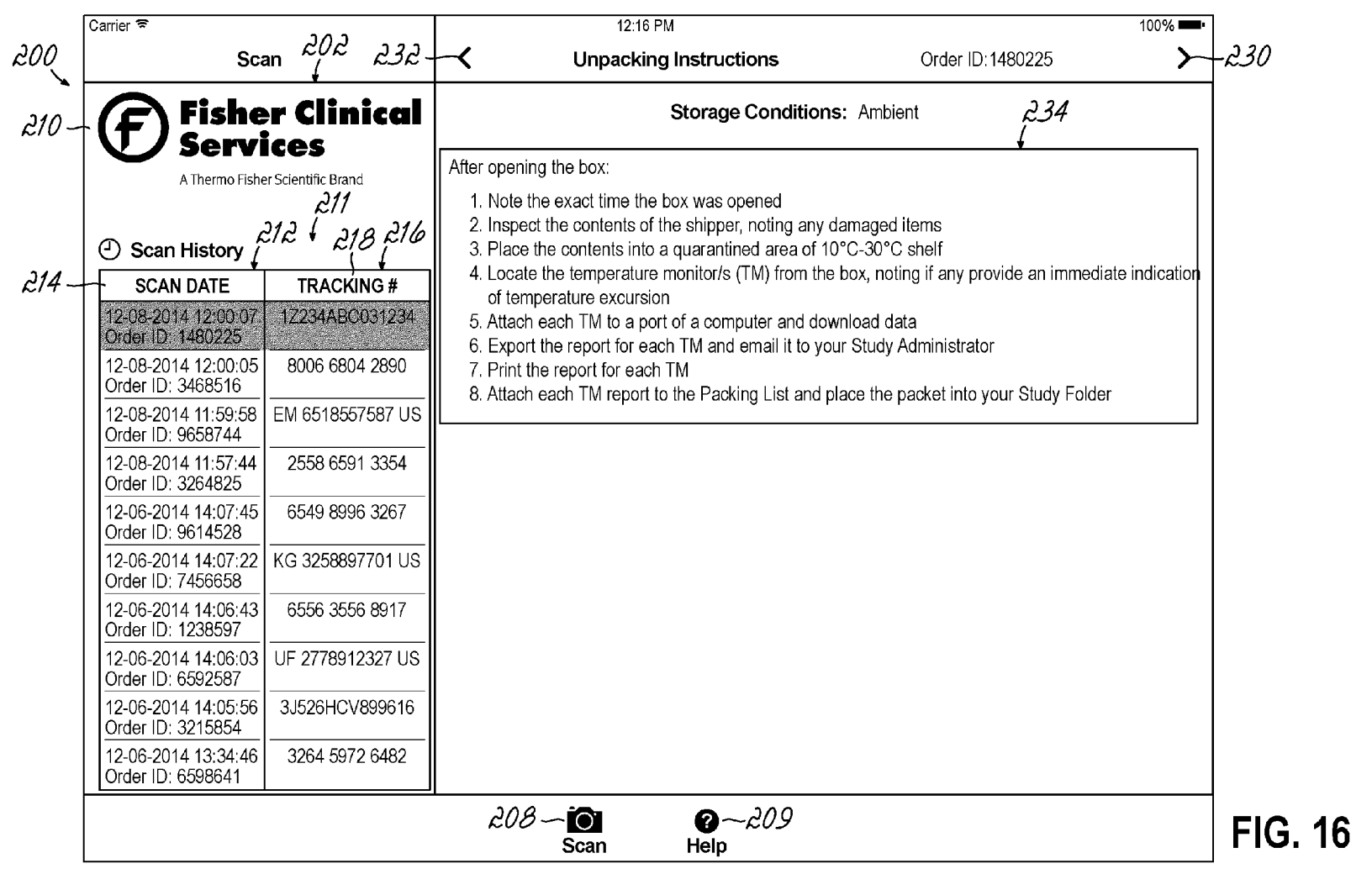

Referring now to FIG. 16, in which like reference numerals refer to like features in FIG. 15, by way of example, in response to the user selecting the forward button 230, the user interface 200 may display an instructions window 234. The instructions window 234 may display, for example, unpacking instructions for the package. The unpacking instructions may include instructions regarding storage conditions for the articles, required documentation for receiving the package 17, downloading data from the environmental monitoring unit 172, or any other suitable instructions for handling the package 17 or the contents thereof. For example, the unpacking instructions may instruct the user to store the articles in payload 167a at ambient temperature (as indicated in FIG. 16), or, for different articles, to store the article at a controlled condition, such as in a refrigerator at 0° C., or a freezer at −40° C.

Figure 17:
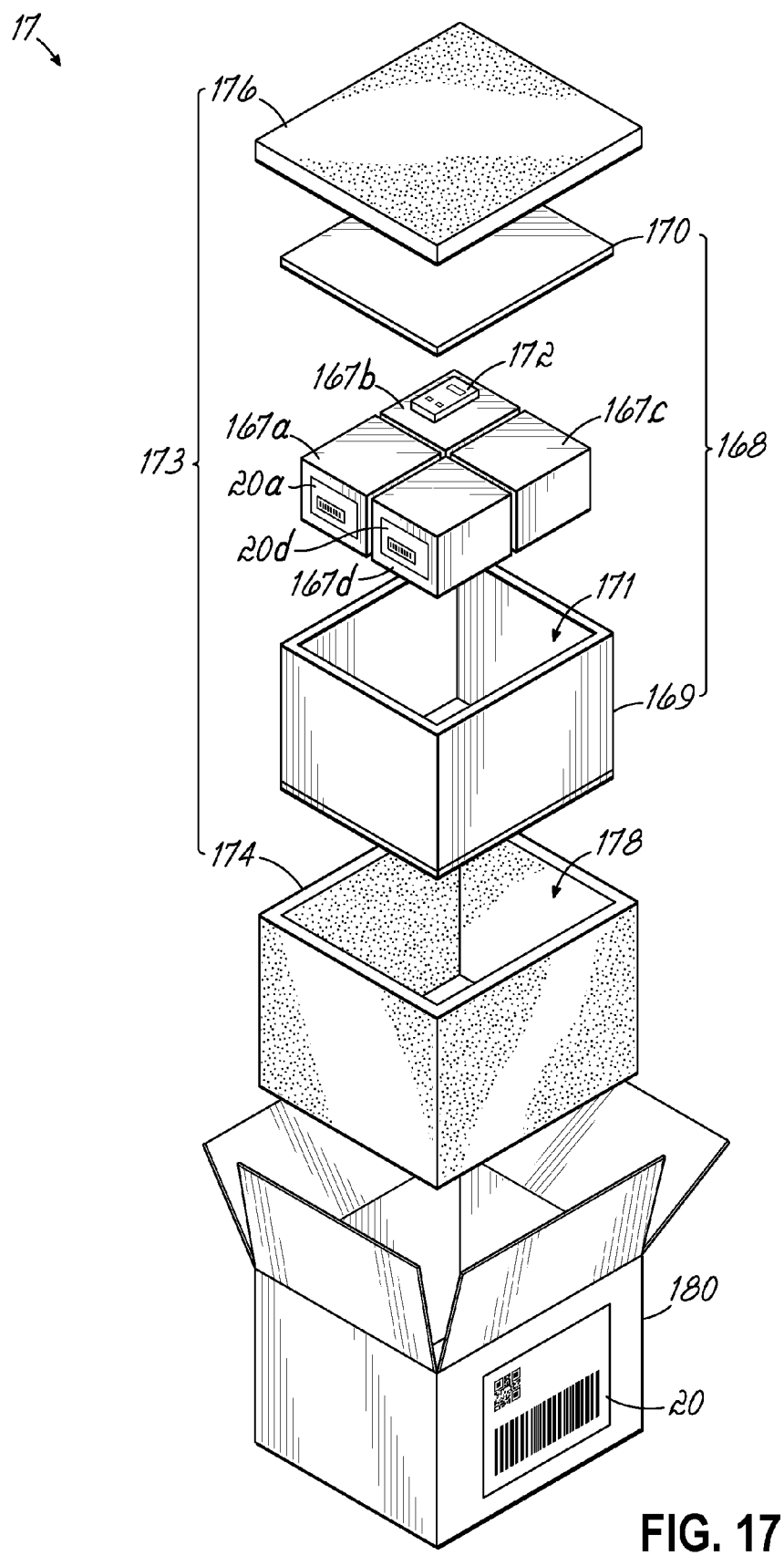
FIG. 17 is an exploded perspective view of the exemplary package of FIG. 1 with a plurality of payloads.

Referring now to FIG. 17, in which like reference numerals refer to like features in FIG. 14, the package 17 is illustrated as including multiple (e.g., four) payloads 167a-167d. In the illustrated embodiment, the payloads 167a-167d are packed into the same cooling assembly 168, which may the case for multiple payloads 167a-167d that require shipping under similar environmental conditions. However, embodiments of the present invention are not limited to packages 17 having a single cooling assembly 168. Persons having ordinary skill in the art will understand that packages 17 may also be configured with multiple cooling assemblies 168, or cooling assemblies having multiple cavities 171 to accommodate payloads 167a-167d having different environmental requirements.

For the case of multiple payloads 167a-167d, the package 17 may include a single environmental monitoring unit 172 for monitoring conditions in the cooling assembly 168 as shown, or separate environmental monitoring units 172 that monitor each payload 167a-167d. Separate environmental monitoring units 172 may be used, for example, for packages having payloads 167a-167d with different environmental requirements, or to track each payload 167a-167d after it is separated from the package 17. An application in which it may be advantageous to ship multiple payloads 167a-167d in a single package 17 may include shipments of laboratory products to commercial or university research facility. For example, articles that are to be stored in different locations (e.g., freezers) within the facility may be packed as separate payloads 167a-167d to facilitate delivery of the articles contained in the payloads 167a-167d to the proper location within the facility.

Figure 18:
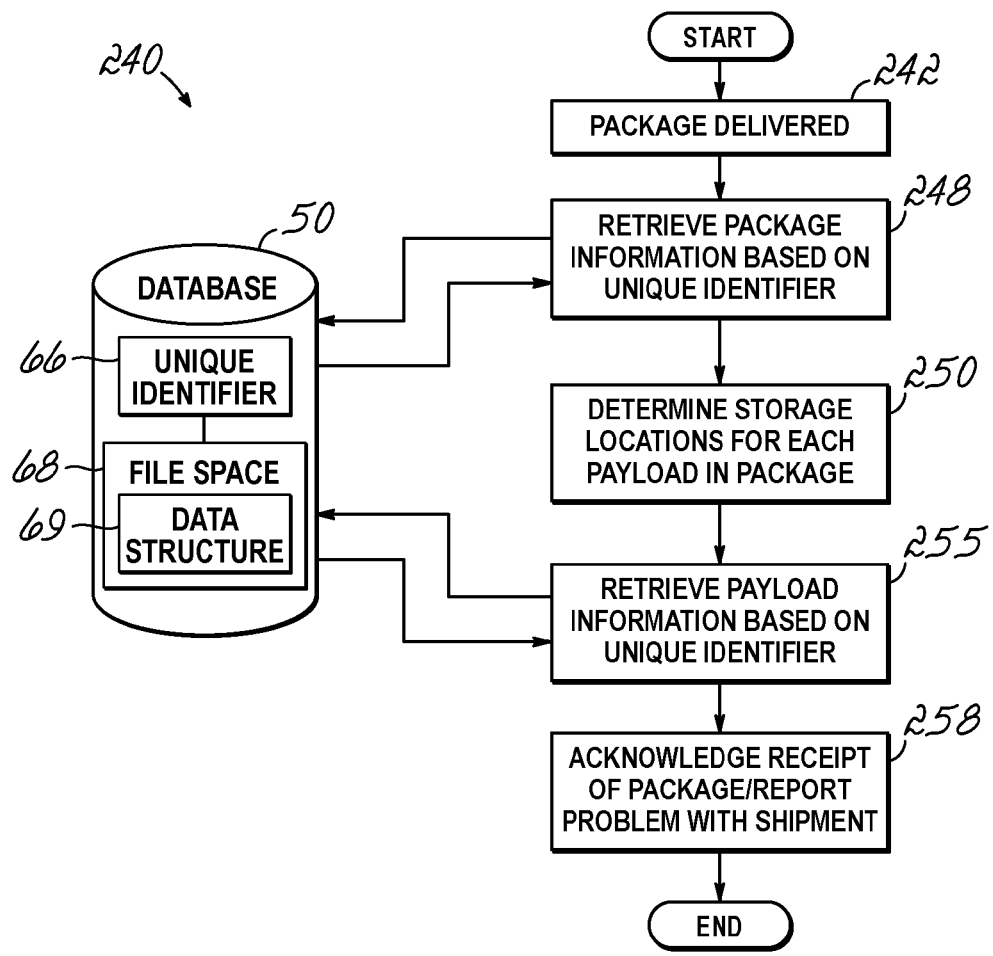
FIG. 18 is a flow chart illustrating an exemplary process for receiving the package in FIG. 17, retrieving the data from the database of FIG. 3 based on the unique identifier of the package and the payloads, and acknowledging receipt of the package.
Figure 19:
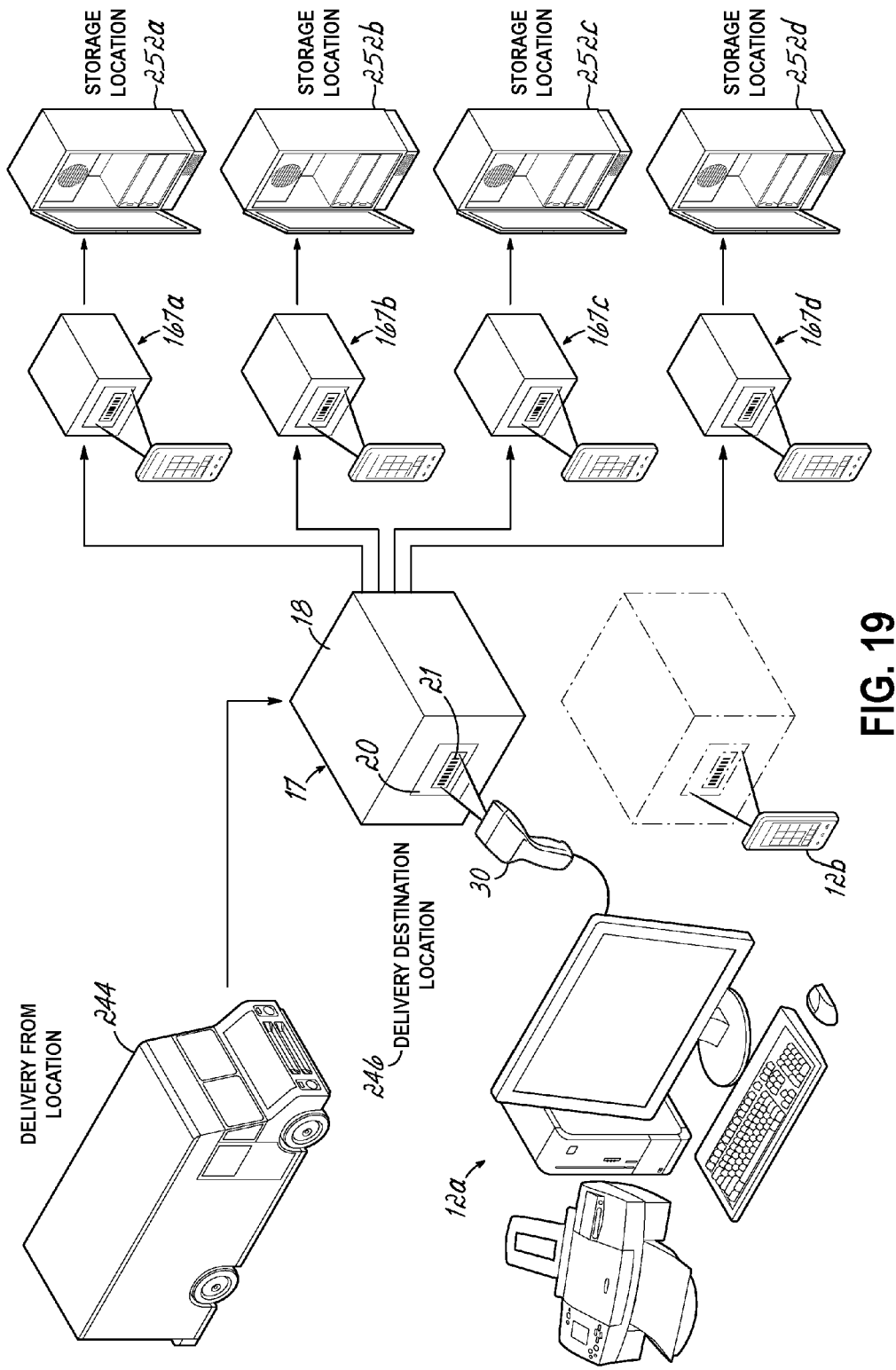
FIG. 19 is a diagrammatic view illustrating reception of the package in FIG. 17 from a supplier, and distribution of the payloads in the package to a plurality of storage locations.

Referring now to FIGS. 18 and 19, in which like reference numerals refer to like features in FIGS. 1 and 17, a flow chart 240 of an exemplary process for receiving packages 17 having multiple payloads 167a-167d is presented in accordance with an embodiment of the invention. In block 242, the package 17 may be delivered from a source location 244 (e.g., a distribution center for a supplier of laboratory products) to a receiving location 246 (e.g., a shipping and receiving department at a research facility). At the receiving location 246, the machine readable code 21 of receiving label 20 on the exterior of package 17 may be scanned by a suitably configured computing device 12a, 12b, which is depicted in FIG. 19 as a desktop computer coupled an external scanning device 30, or a smart phone, although other devices could be used. In response to the scanning the machine readable code 21, the application 34 may proceed to block 248 and retrieve data from the database 50 using the unique identifier code, as described above with respect to FIG. 6.

In response to receiving the data from the database 50, the application 34 may proceed to block 250 and determine a storage location 252a-252d for each of the payloads 167a-167d in the package 17. The application 34 may, in turn, display the storage locations 252a-252d to the user, thereby facilitating delivery of the payloads 167a-167d to the designated storage location 252a-252d for final storage and/or unpacking.

Figure 20:
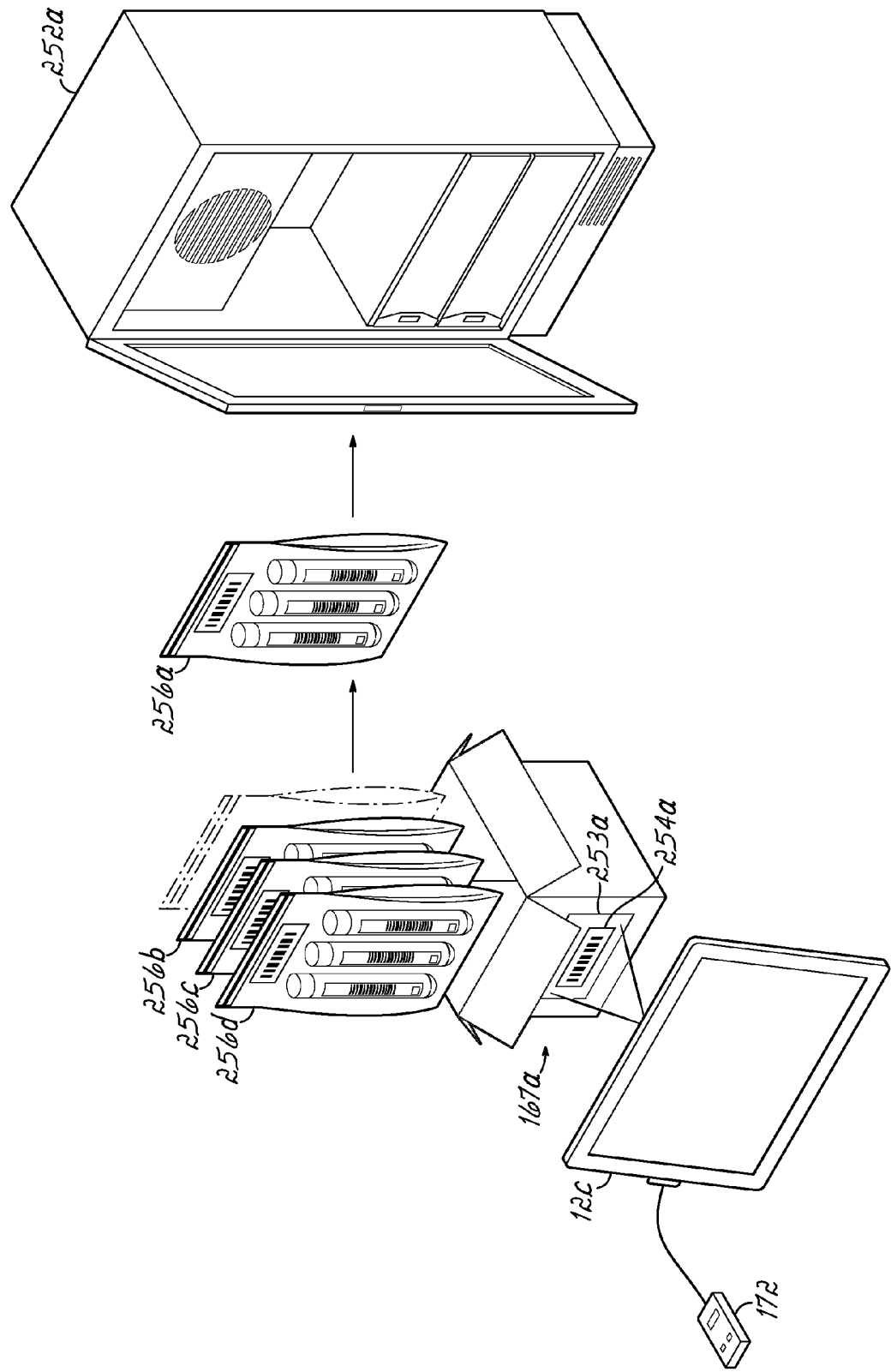
FIG. 20 is a diagrammatic view illustrating unpacking of articles from one of the payloads and storing the articles in one of the storage locations of FIG. 19.

Referring now to FIG. 20, in which like reference numerals refer to like features in FIG. 19, and with continued reference to FIG. 18, in an embodiment of the present invention, the payload 167a may include a label 253a having a machine readable code 254a. Upon arrival at the storage location 252a, the user may scan the machine readable code 254a using a computing device 12c, such as the depicted tablet computer. In block 255, the application 34 may retrieve data from the database 50 based on a unique identifier provided by the machine readable code 254a that uniquely identifies the payload 167a. In response to receiving the unique identifier provided by the machine readable code 254a, the database 50 may transmit information relating to the payload 167a to the computing device 12c. This data may include instructions specific to the payload 167a for removing articles 256a-256d from the payload 167a and placing the articles 256a-256d in the storage location 252a. In some cases, the instructions may instruct the user to place the payload 167a into the storage location 252a intact. That is, rather than unpacking the payload 167a as depicted in FIG. 20, the payload 167a may simply by placed intact in the storage location 252a.

In response to receiving an indication from the user that the articles 256a-256d have been placed in the storage location 252a, the application 34 may proceed to block 258 and provide the user with an interface that enables the user to acknowledge receipt of, or report a problem with, the payload 167a, as described above with respect to FIG. 6.

Figure 21:
FIG. 21 is a diagrammatic view of an exemplary screen shot of the computing device of FIG. 1 illustrating a user interface displayed by the application for delivered packages having a plurality of payloads.

Referring now to FIG. 21, in which like reference numerals refer to like features in FIG. 15, and in accordance with the embodiment of the present invention described with respect to FIGS. 18-20, the packing list window 206 of user interface 200 may be configured to display a separate packing list window 260a-260d for each payload 167a-167d. Each packing list window 260a-260d may include a packing list 228a-228d and a scroll bar 262a-262d that enables the user to scroll through the corresponding packing list 228a-228d. This scrolling function may enable users to view all the articles on packing lists 228a-228d that are too long to display in the space provided by the packing list window 260a-260d. Each packing list window 260a-260d may include a header 264a-264d and a data field 266a-266d. The header 264a-264d may display an identifier 268a-268d that identifies the storage location 252a-252d in which the corresponding payload 167a-167d or articles comprising the payload 167a-167d are to be stored. The packing list windows 260a-260d may thereby facilitate delivery of the payloads 167a-167d to the correct location for storage.

Figure 22:
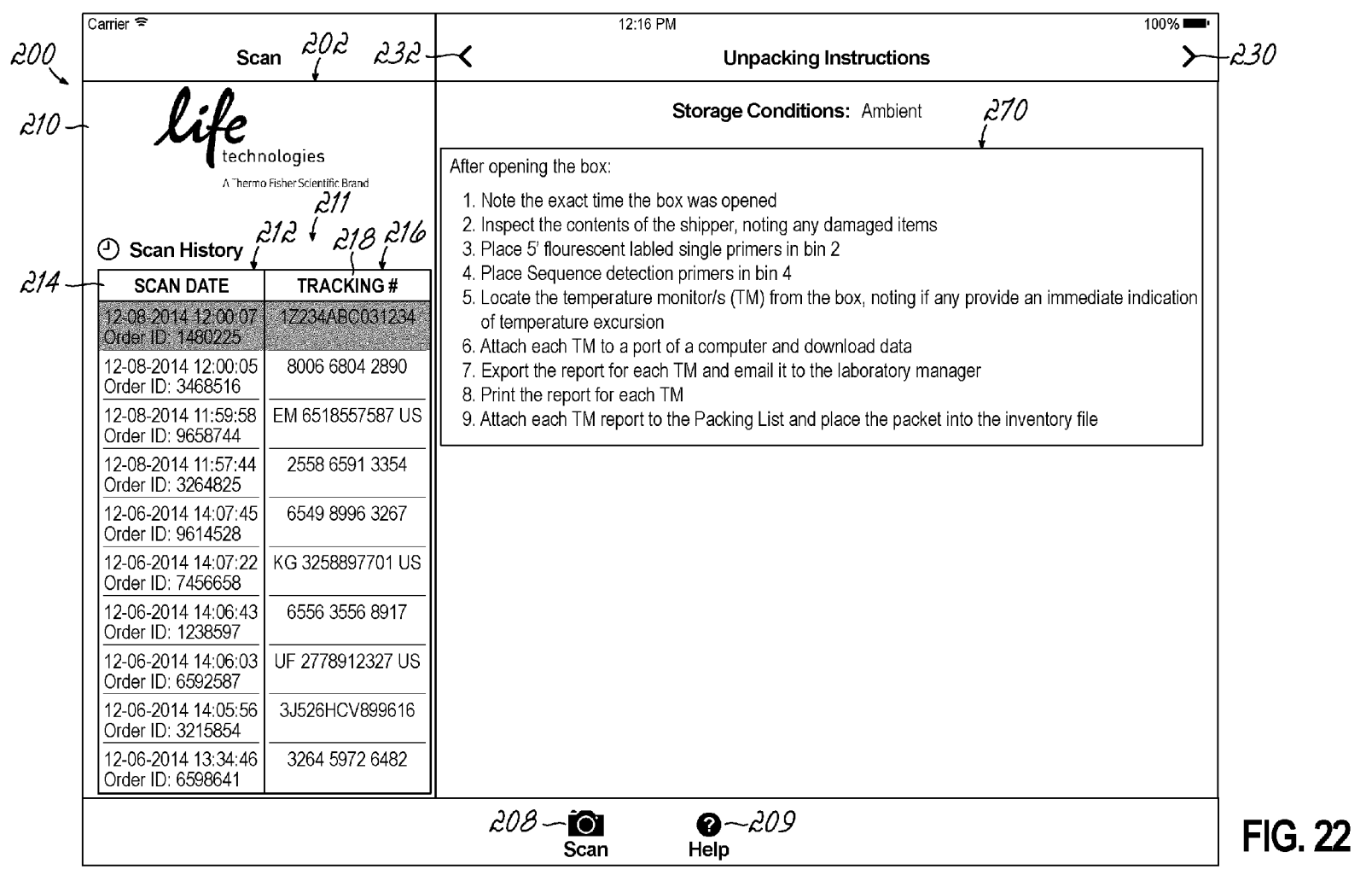

Referring now to FIG. 22, in which like reference numerals refer to like features in FIG. 21, in response to the user indicating a desire to view another window, such as by activating the forward button 230, the user interface 200 may display an instructions window 270 corresponding to the selected packing list window, e.g., packing list window 268*a*. The user interface 200 may indicate which packing list 228*a*-228*d* is selected by, for example, highlighting the selected packing list window 268*a*-268*d*. The instructions window 270 may display unpacking instructions for the payload 167*a* corresponding to the selected packing list window 268*a*. The unpacking instructions may include instructions regarding storage conditions for the articles in the payload 167*a*, required documentation for receiving the payload 167*a*, instructions on downloading data from the environmental monitoring unit 172, or any other suitable instructions for handling the payload 167*a* or the articles in the payload 167*a*. For example, as discussed with respect to FIG. 16, the instructions may instruct the user to store the articles in payload 167*a* at ambient temperature (as indicated in FIG. 22), or, for different articles, to store the article at a controlled condition, such as in a refrigerator or in a freezer.

The required storage conditions may be displayed above the instructions window 270, and the indication may depend on the type of product in the package. Exemplary indicators may include "Ambient" (shown), which indicates that the contents may be stored in a room temperature cabinet; "0° C.", which indicates that the contents are to be stored in a refrigerator at 0° C.; and "−40° C.", which indicates that the contents are to be stored in a freezer at −40° C.

Figure 23:
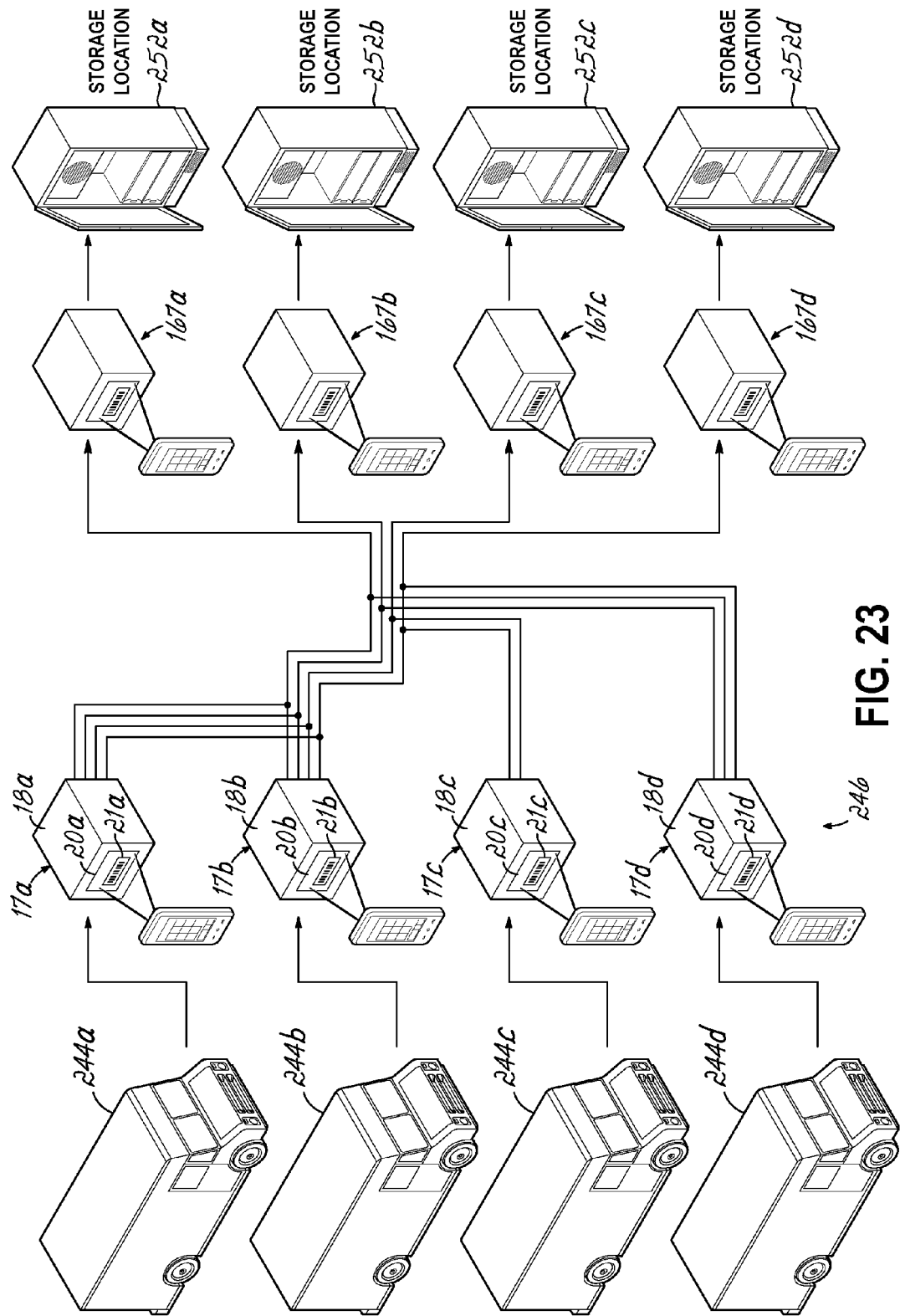
FIG. 23 is a diagrammatic view illustrating reception of a plurality of packages from a plurality of suppliers, and distribution of the payloads in the packages to the plurality of storage locations in FIG. 19.

Referring now to FIG. 23, in which like reference numerals refer to like features in FIG. 19, the receiving location 246 may at times receive plurality of packages 17*a*-17*d*, with each package 17*a*-17*d* arriving from a different source location 244*a*-244*d*. As the packages arrive, machine readable codes 21*a*-21*d* may be scanned on receiving labels 20*a*-20*d* corresponding to the packages 17*a*-17*d*. For packages 17*a*-17*d* having a plurality of payloads, each payload may be routed to the storage location 252*a*-252*d* designated in the corresponding packing list. The system 10 may thereby facilitate routing articles to designated storage areas, accurate tracking of inventory, and increased compliance with environmental requirements through careful documentation, tracking of articles at every level, and adherence to strict temperature requirements at all points in the supply chain.

Figure 24:
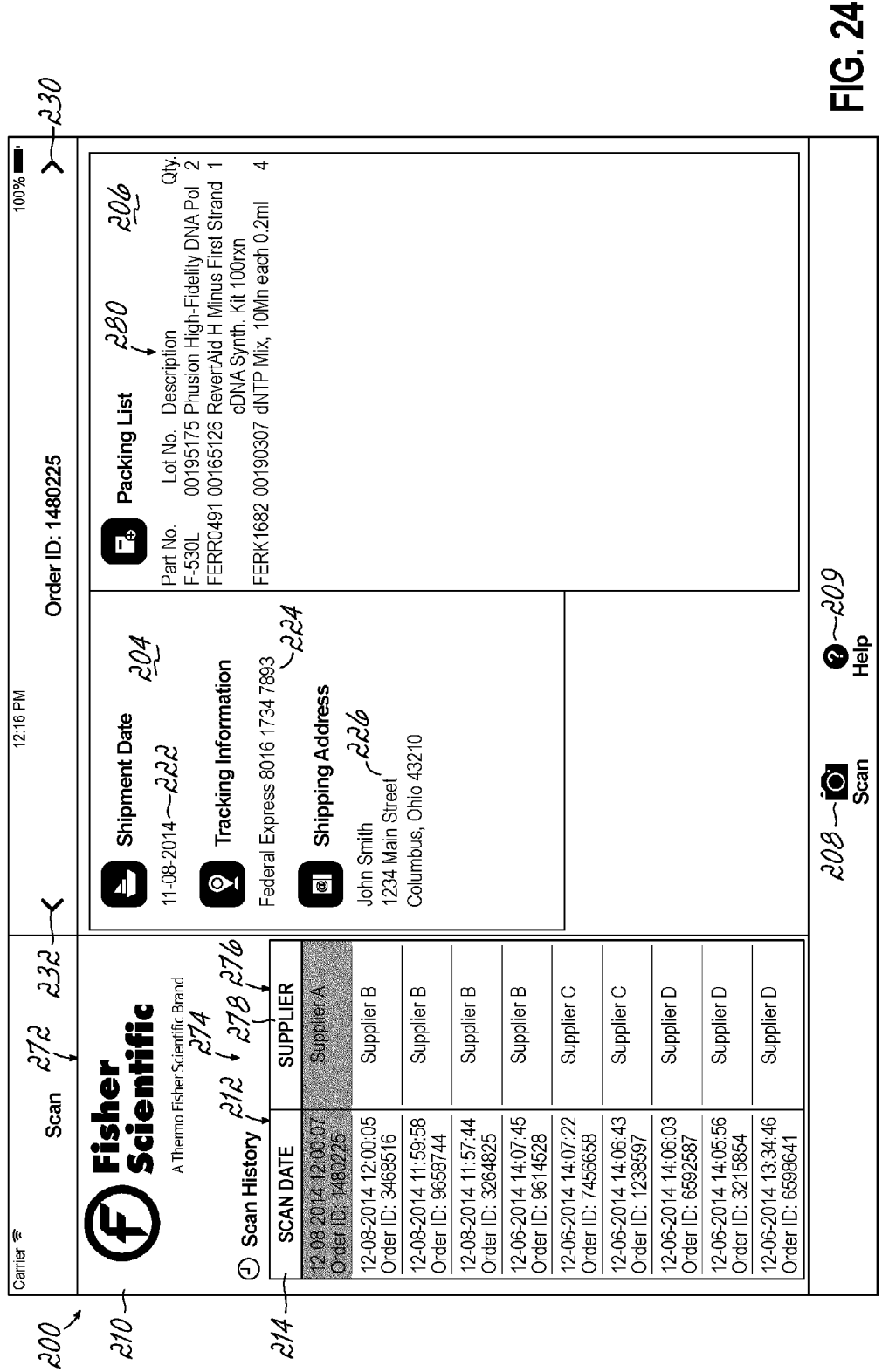
FIG. 24 is a is a diagrammatic view of an exemplary screen shot of the computing device of FIG. 1 illustrating a user interface displayed by the application for delivered packages from one of the suppliers in FIG. 23.

Referring now to FIG. 24, in which like reference numerals refer to like features in FIG. 15, and in accordance with an alternative embodiment of the present invention, the user interface 200 may be configurable to include a scan history window 272 that is supplier focused. To this end, the scan history window 272 may include a scan history table 274 having the scan data column 212 with the column header 214, and a supplier column 276 having a column header 278. The scan history table 274 may comprise a plurality of rows, with each row displaying data relating to a scan performed by the application 34. In response to the user selecting one of the column headers 214, 278, the application may sort the rows of the scan history based on the data and time of the scan, or the supplier from which the package 17 was received. The packing list window 206 may be configured to display a packing list 280 that includes part numbers, lot numbers, descriptions, and quantities of the articles in scanned package represented by a selected row of the scan history table 274.

While the present invention has been illustrated by the description of embodiments thereof, and while these embodiments have been described in considerable detail, it is not the intention of the applicant to restrict or in any way limit the scope of the appended claims to such detail. Additional advantages and modifications will readily appear to those skilled in the art. Therefore, the present invention in its broader aspects is not limited to the specific details of the representative apparatus and method, and illustrative examples shown and described. Accordingly, departures may be made from such details without departing from the spirit or scope of applicants' general inventive concept.

For example, although the system processes illustrated in FIGS. 3 and 6 are described above as generally linear sequences, persons having ordinary skill in the art will understand that system messages may be transmitted in different sequences or even concurrently. Moreover, additional functions and queries may be performed during various system processes. Embodiments of the present invention are thus not limited to performing the shown functions in a particular sequence, or storing data in a particular location. It should also be understood that the terms "query", "response", "confirmation", and/or "message" as used herein are considered interchangeable. Use of any one of these terms is therefore not intended to imply that any particular quality is associated with regard to type of signal being used to transmit or receive the "query", "response", "confirmation", and/or "message". Nor is any there to be any implication regarding the nature of the data conveyed by a signal based on the use of the term "query", "response", "confirmation", and/or "message" in describing said signal or the data conveyed thereby.

What is claimed is:

1. A method of managing inventory, the method comprising:
   receiving a package containing a first article including a first machine readable code and a second article including a second machine readable code;
   scanning the first machine readable code and the second machine readable code with a first scanning device;
   in response to scanning the first machine readable code and the second machine readable code, receiving first data including a first set of instructions for handling the first article and second data including a second set of instructions for handling the second article at a first data receiving device, the first data and the second data including a packing list; and
   displaying, by the first data receiving device, the first set of instructions and the second set of instructions so that the first article is handled differently than the second article due to differences in the first data and the second data.

2. The method of claim 1 wherein the packing list identifies the first article contained in the package and a first storage unit in which the first article is to be stored.

3. The method of claim 2 wherein the first article is one of a plurality of articles contained in the package, and the packing list further identifies the second article contained in the package and a second storage unit in which the second article is to be stored.

4. The method of claim 2 wherein the second article is associated with the second machine readable code, and further comprising:
   in response to scanning the second machine readable code, receiving instructions on storing the second article in the second storage unit.

5. The method of claim 4 wherein the instructions include a request for data relating to storage of the second article in the first second storage unit.

6. The method of claim 5 wherein the request for data includes a request for an identity of a location in the first storage unit in which the first article is being stored.

7. The method of claim 5 further comprising:
in response to the request for data, receiving the data relating to the storage of the first article in an inventory database; and
updating the inventory database based on the received data.

8. The method of claim 4 wherein the second machine readable code is provided by a label affixed to an article, or a label affixed to a container comprising a payload of which the article is a part.

9. The method of claim 4 further comprising:
delivering the first article to the first storage unit; and
scanning the second machine readable code with a second scanning device.

10. The method of claim 4 wherein the instructions include instructions for where to place each article within the first storage unit.

11. A computing system for managing inventory, the system comprising:
one or more processors; and
memory operatively coupled to the one or more processors, the memory including program code that, when executed by at least one of the one or more processors, causes the system to:
scan a first machine readable code associated with a first article included in a received package and a second machine readable code associated with a second article included in the received package;
in response to scanning the first machine readable code and the second machine readable code, receive first data including a first set of instructions for handling the first article and second data including a second set of instructions for handling the second article, the first data and the second data including a packing list; and
display the first set of instructions and the second set of instructions so that the first article is handled differently than the second article due to differences in the first data and the second data.

12. The system of claim 11 wherein the packing list identifies the first article contained in the package and a first storage unit in which the first article is to be stored.

13. The system of claim 12 wherein the first article is one of a plurality of articles contained in the package, and the packing list further identifies the second article contained in the package and a second storage unit in which the second article is to be stored.

14. The system of claim 12 wherein the second article is associated with the second machine readable code, and the program code is further configured to cause the system to:
in response to scanning the second machine readable code, receive instructions for storing the second article in the second storage unit.

15. The system of claim 11 wherein the scanning device comprises the data receiving device.

16. A computer program product comprising:
a non-transitory computer readable storage medium; and
instructions stored on the non-transitory computer readable storage medium that, when executed by a processor of a scanning device, cause the scanning device to:
scan a first machine readable code associated with a first article included in a received package and a second machine readable code associated with a second article included in the received package;
in response to scanning the first machine readable code and the second machine readable code, receive first data including a first set of instructions for handling the first article and second data including a second set of instructions for handling the second article, the first data and the second data including a packing list; and
display the first set of instructions and the second set of instructions so that the first article is handled differently than the second article due to differences in the first data and the second data.

* * * * *

UNITED STATES PATENT AND TRADEMARK OFFICE
CERTIFICATE OF CORRECTION

PATENT NO.        : 9,552,565 B2
APPLICATION NO.   : 14/444103
DATED             : January 24, 2017
INVENTOR(S)       : Greg Minogue et al.

It is certified that error appears in the above-identified patent and that said Letters Patent is hereby corrected as shown below:

In the Drawings

Fig. 22, box 270, #3, "labled" should read --labeled--

In the Specification

Column 4, Line 64, "FIG. 24 is a is a diagrammatic view of" should read --FIG. 24 is a diagrammatic view of--

Column 12, Line 26, "receiving labels 20 is configured" should read --receiving labels 20 are configured--

Column 12, Line 39, "article is not flagged" should read --article are not flagged--

Column 14, Line 15, "such a desktop" should read --such as a desktop--

Column 14, Line 34, "receiving labels" should read --receiving label--

Column 18, Lines 15-16, "be adjusted base on" should read --be adjusted based on--

Column 18, Line 46, "a new row the scan" should read --a new row of the scan--

Column 19, Line 1, "response to the user to activating" should read --response to the user activating--

Column 19, Line 29, "may the case" should read --may be the case--

Column 19, Lines 48-49, "products to commercial" should read --products to a commercial--

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,552,565 B2

Column 19, Line 66 to Column 20, Line 1, "computer coupled an external" should read --computer coupled to an external--

Column 22, Line 22, "Nor is any there" should read --Nor is there--

In the Claims

Claim 5, Column 22, Line 62, "thefirst second storage unit" should read --the second storage unit--